June 19, 1962 J. B. HOLMES 3,039,233
APPARATUS FOR LAYING BUILDING BLOCKS
Filed Dec. 30, 1958 15 Sheets-Sheet 8
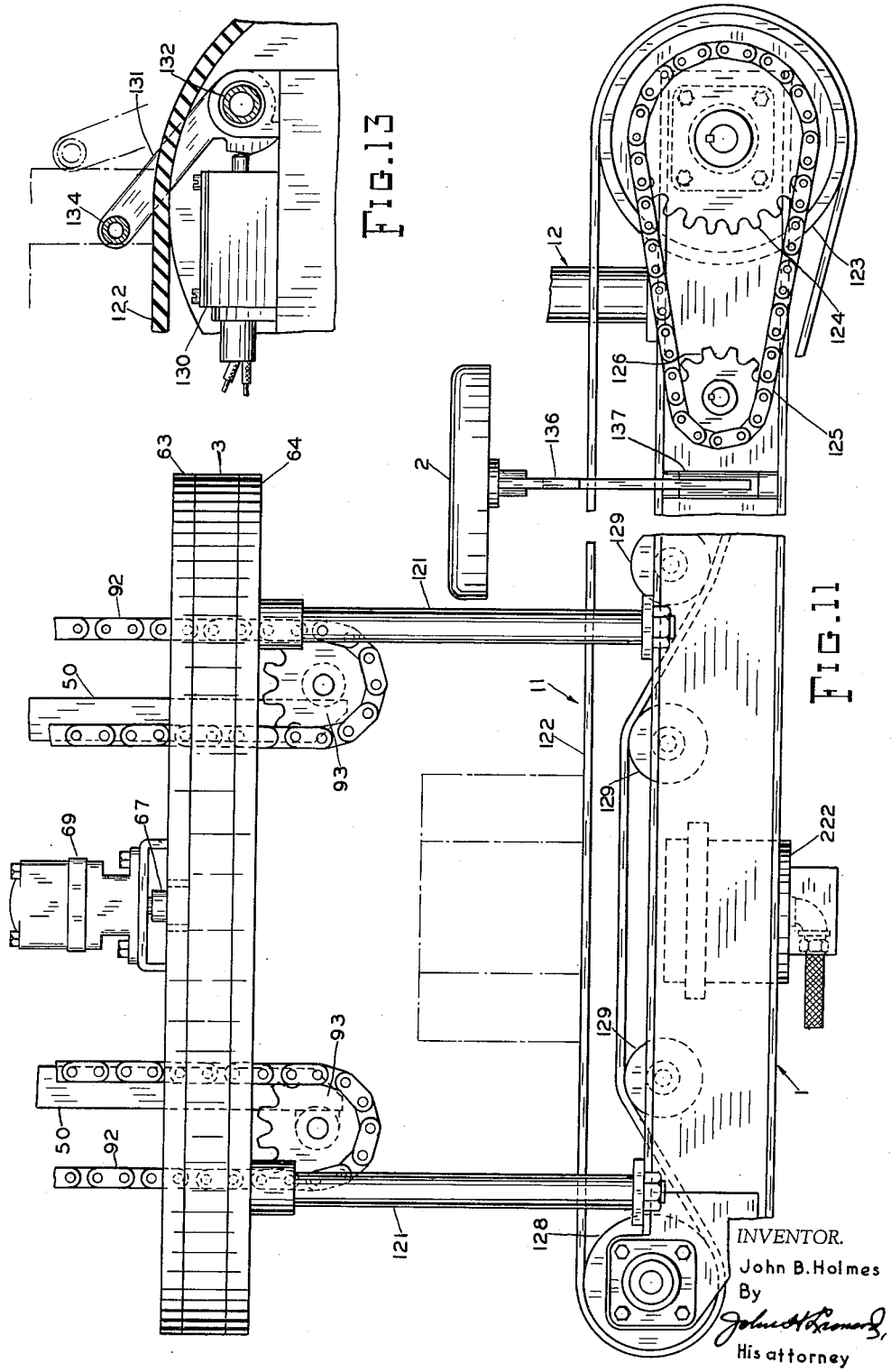
INVENTOR.
John B. Holmes
By
His attorney

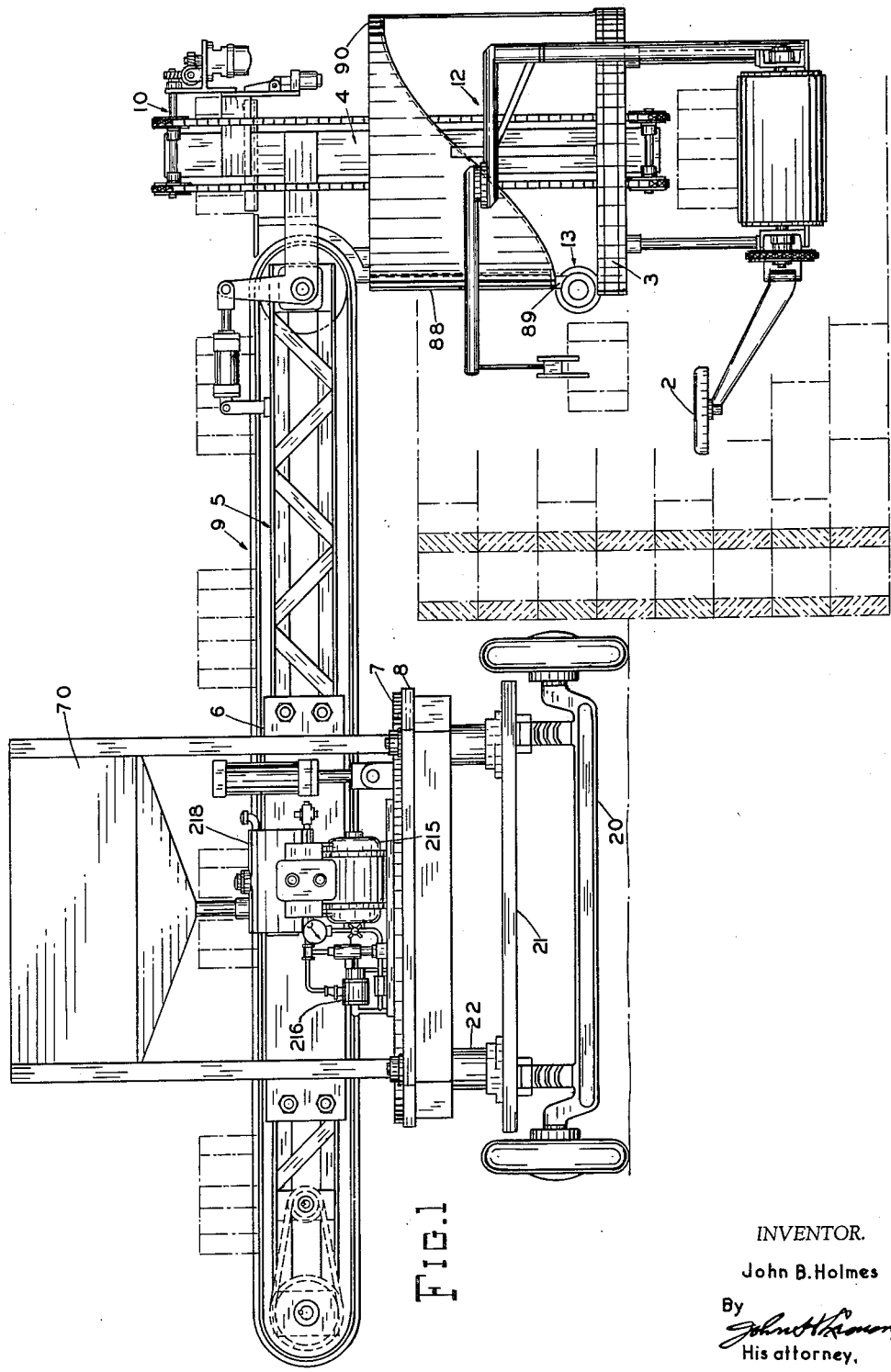

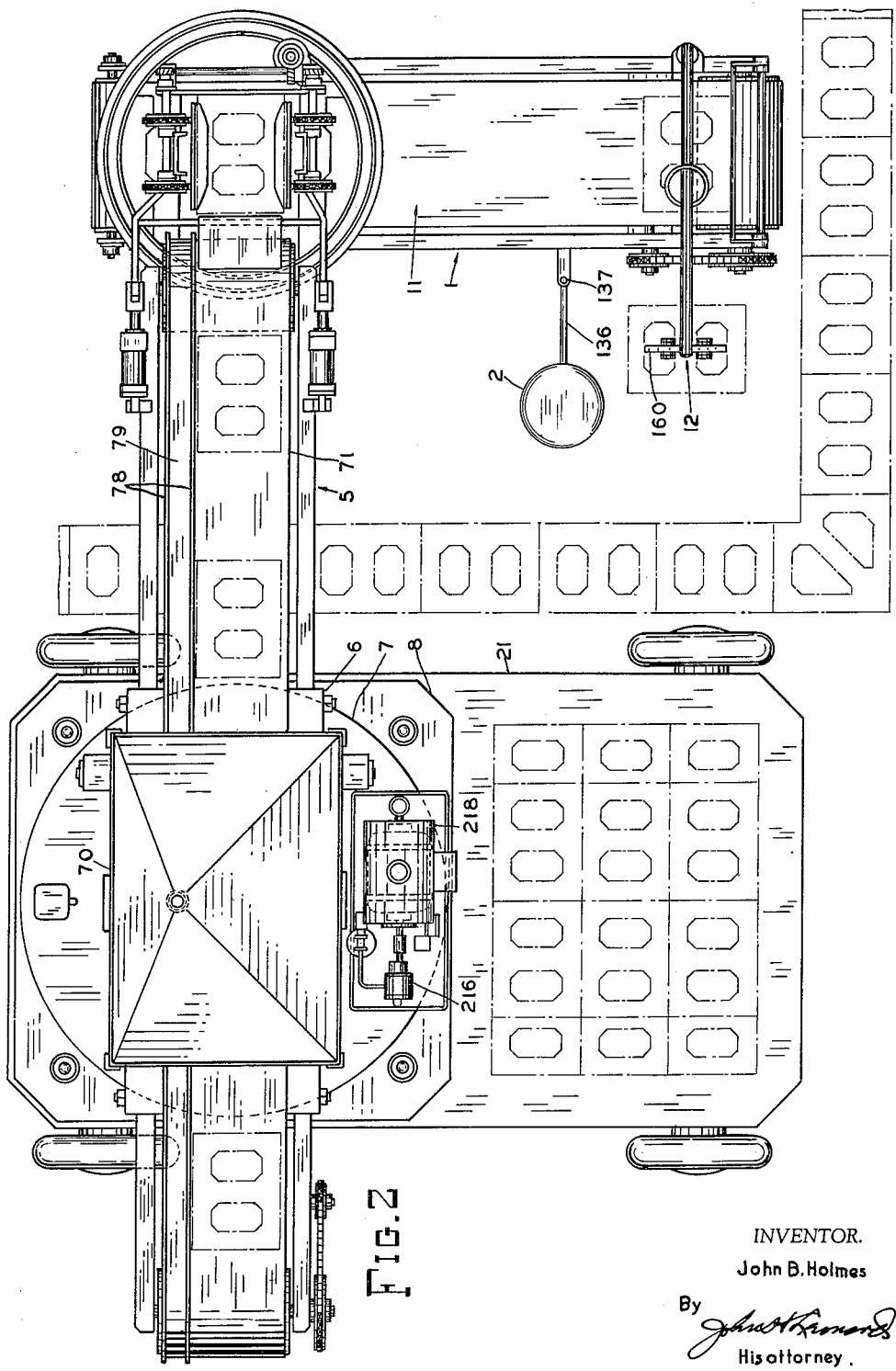

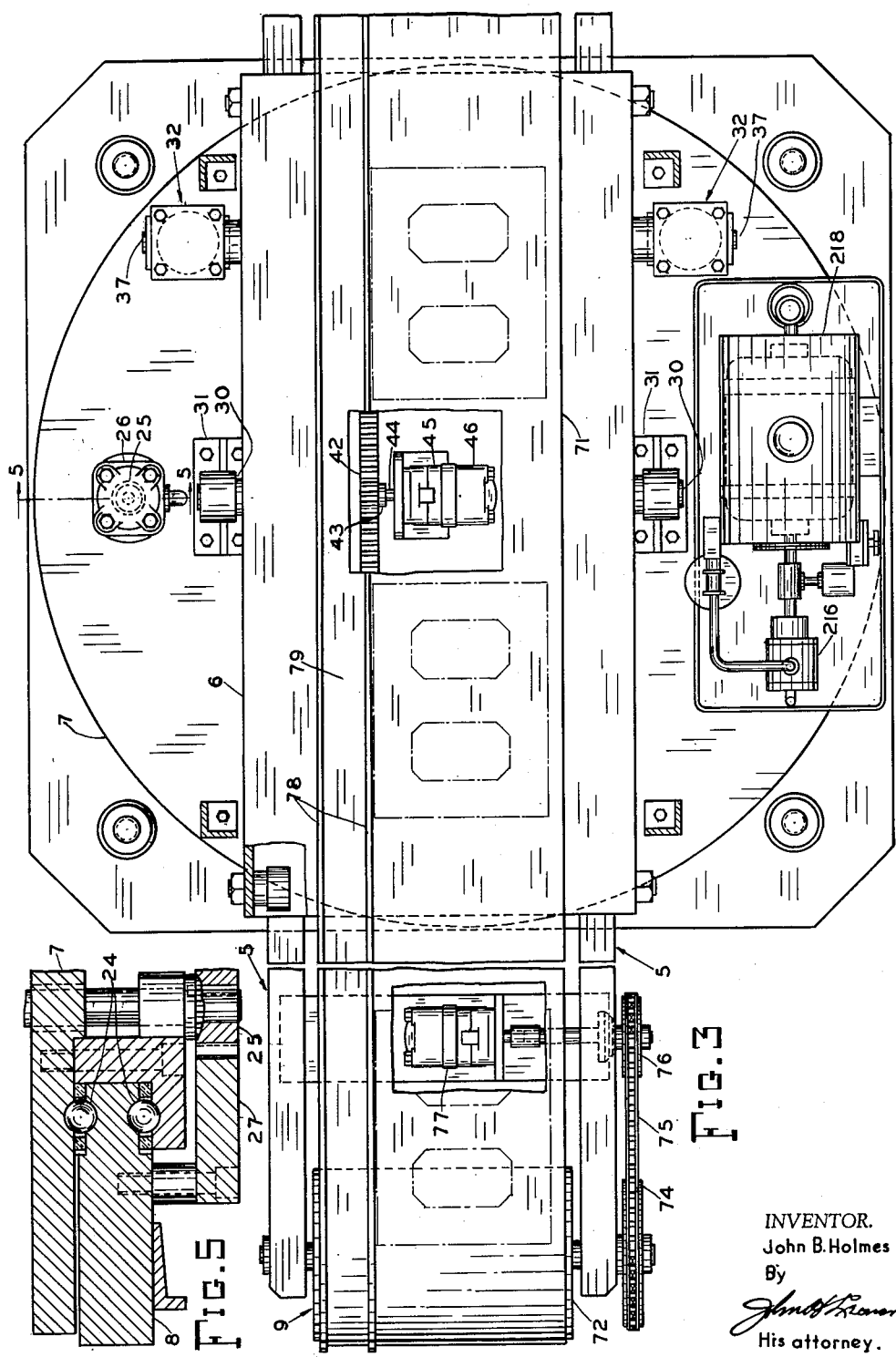

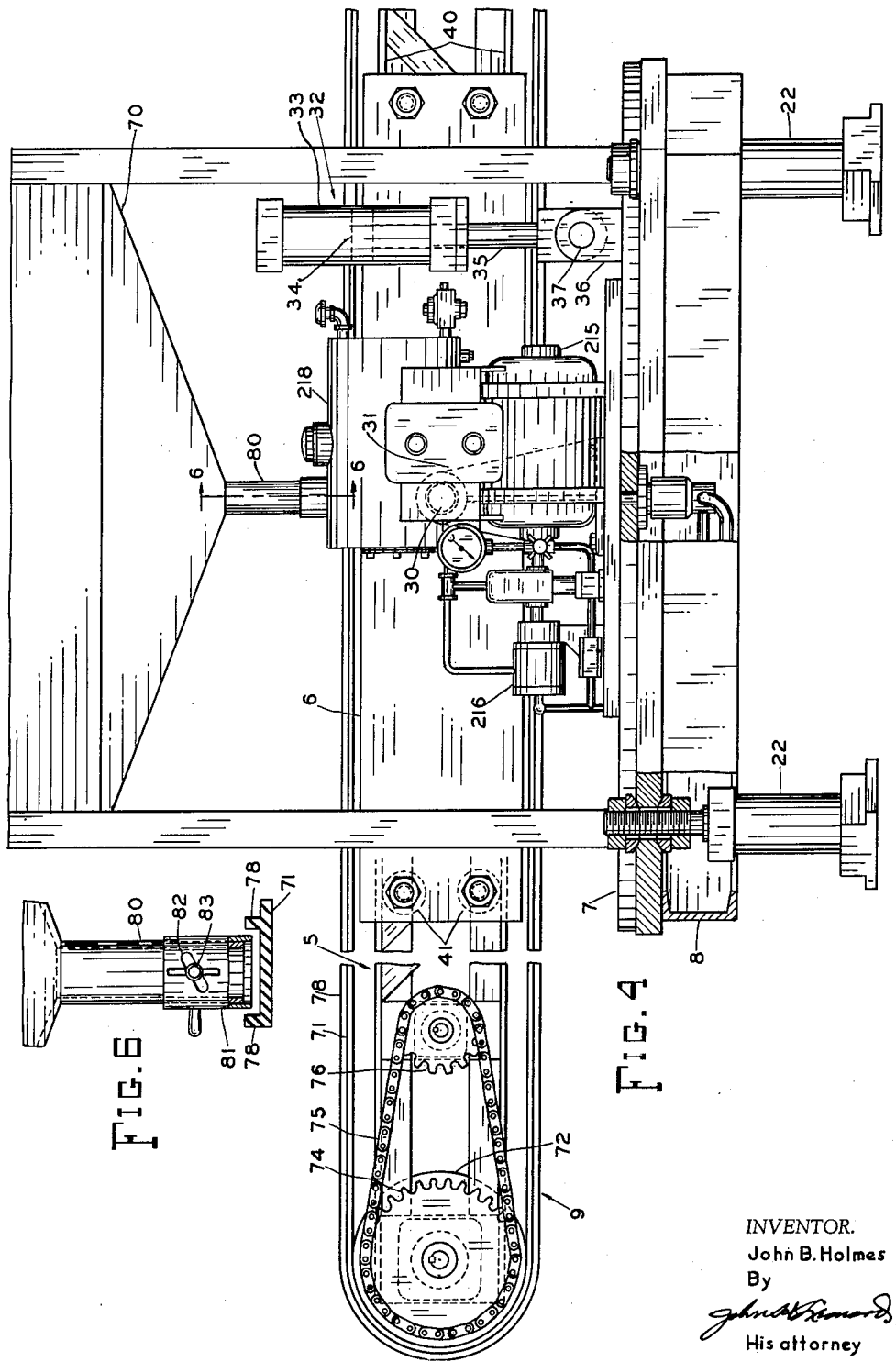

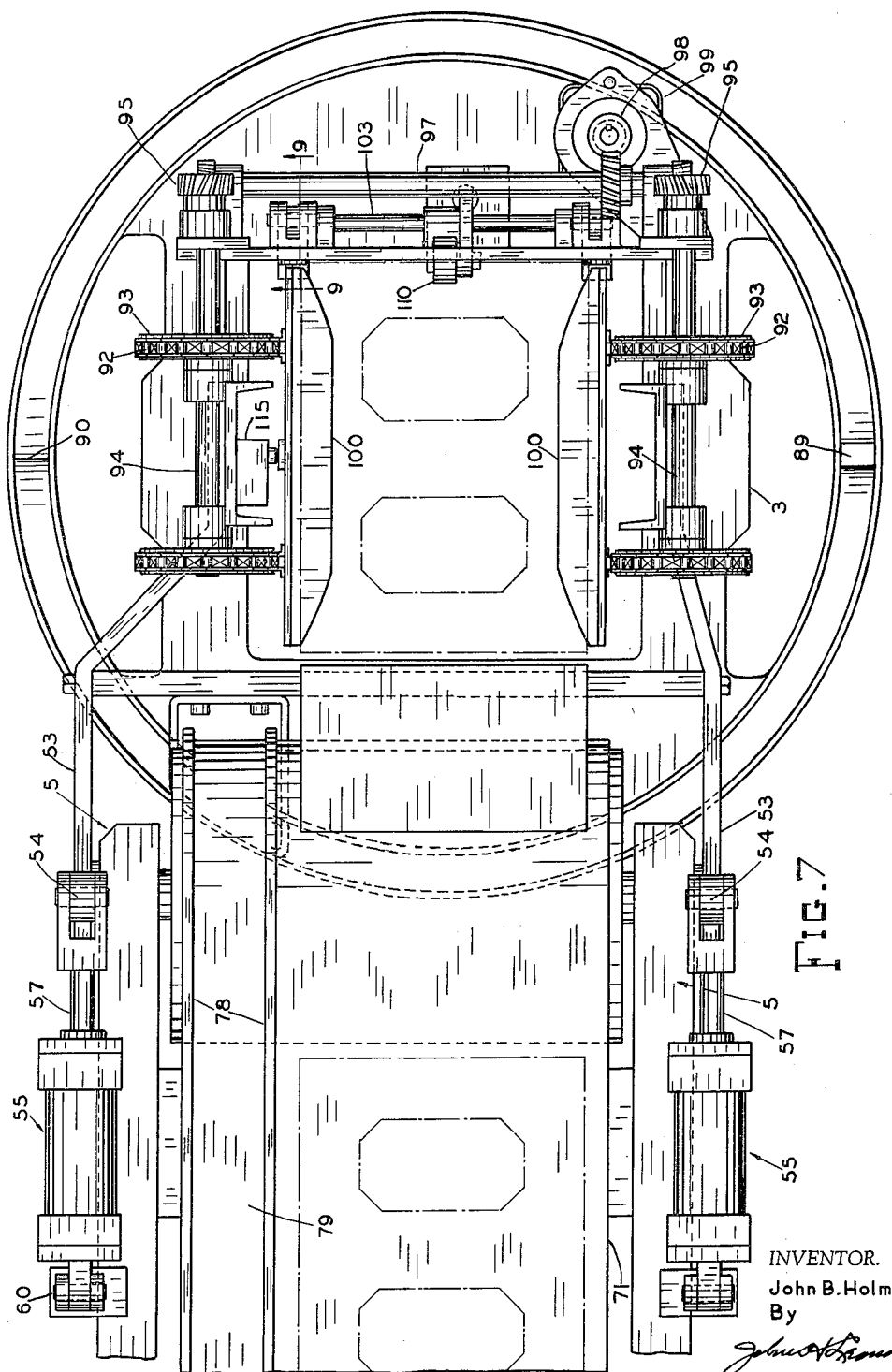

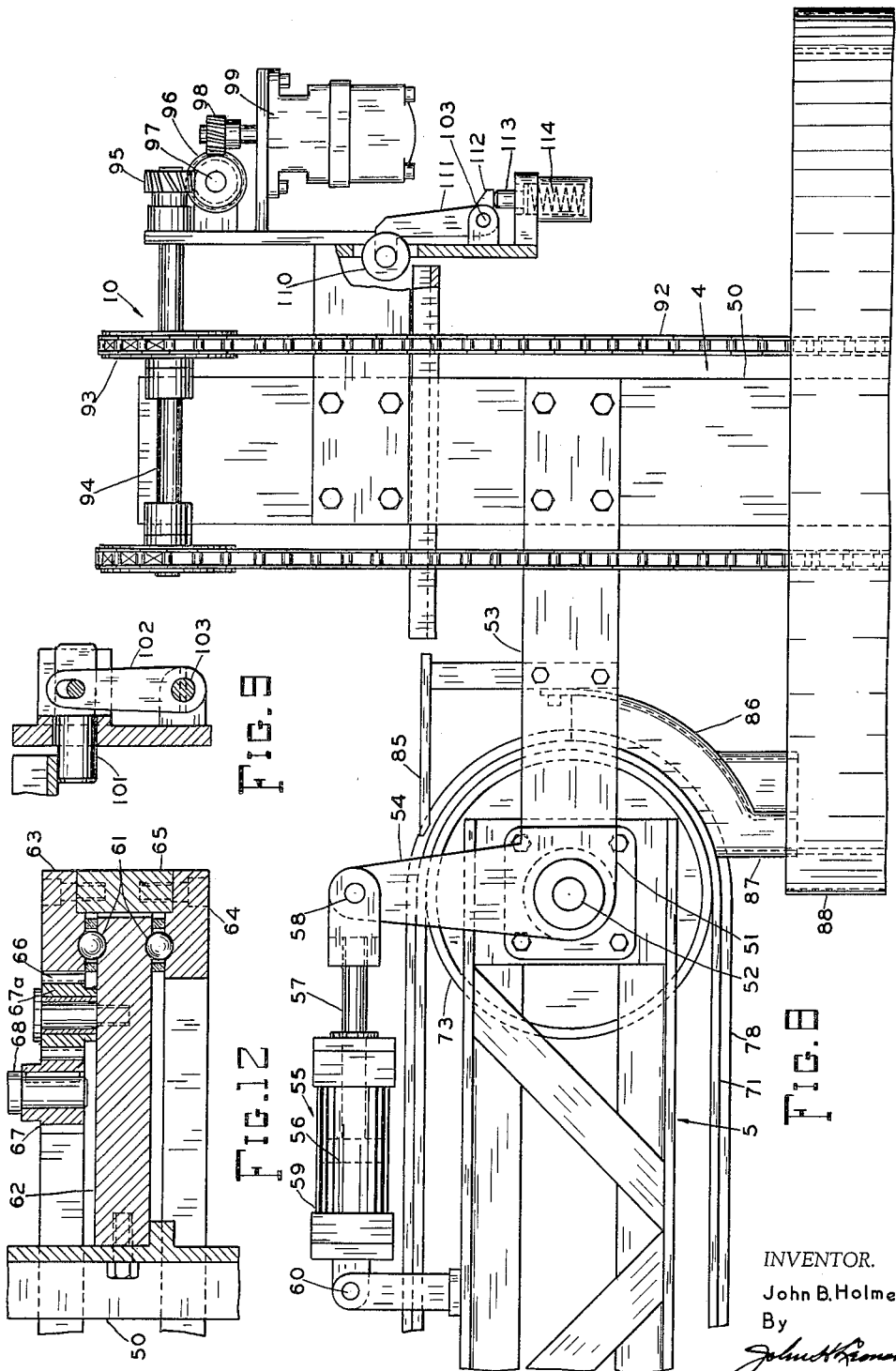

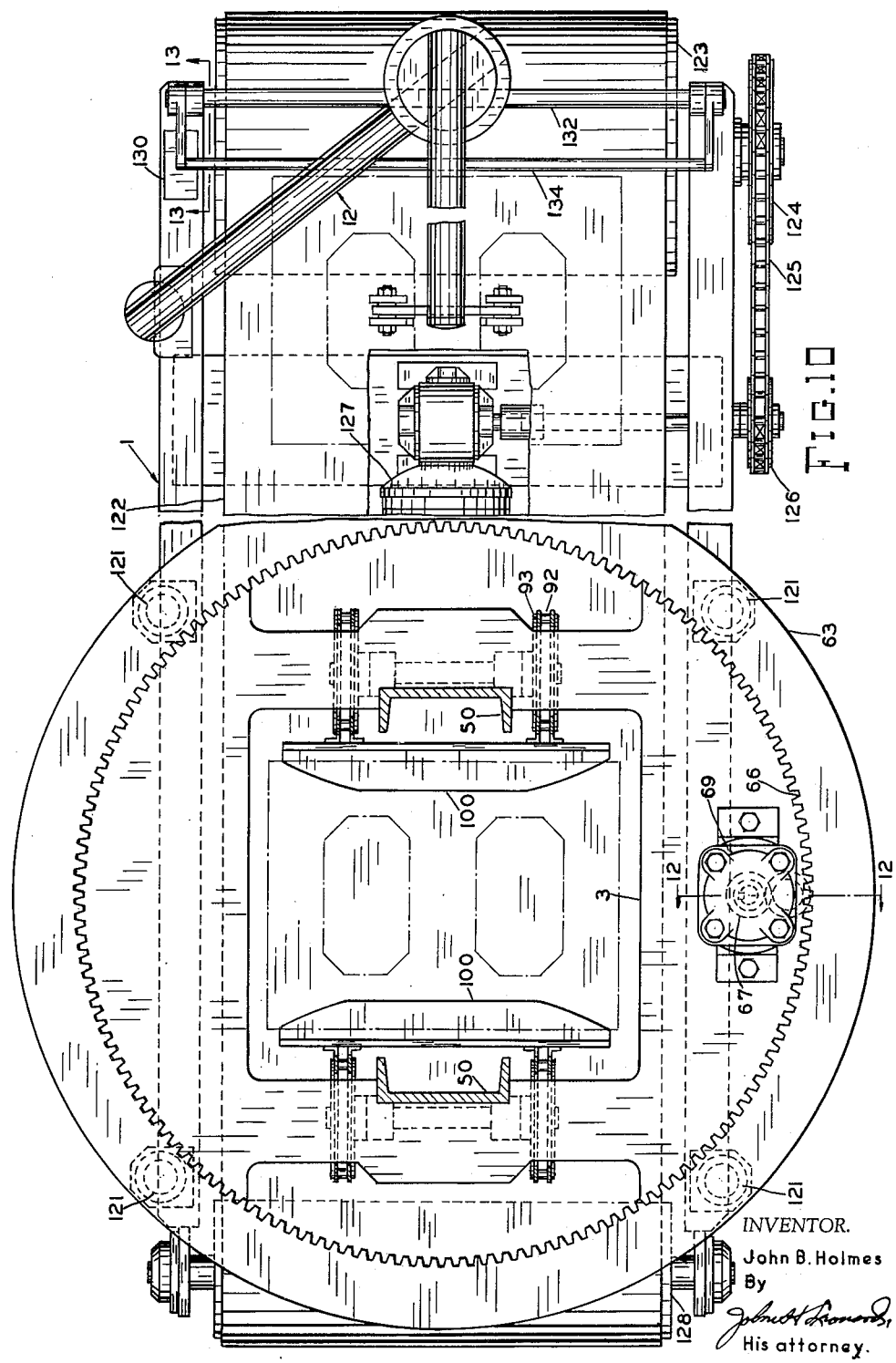

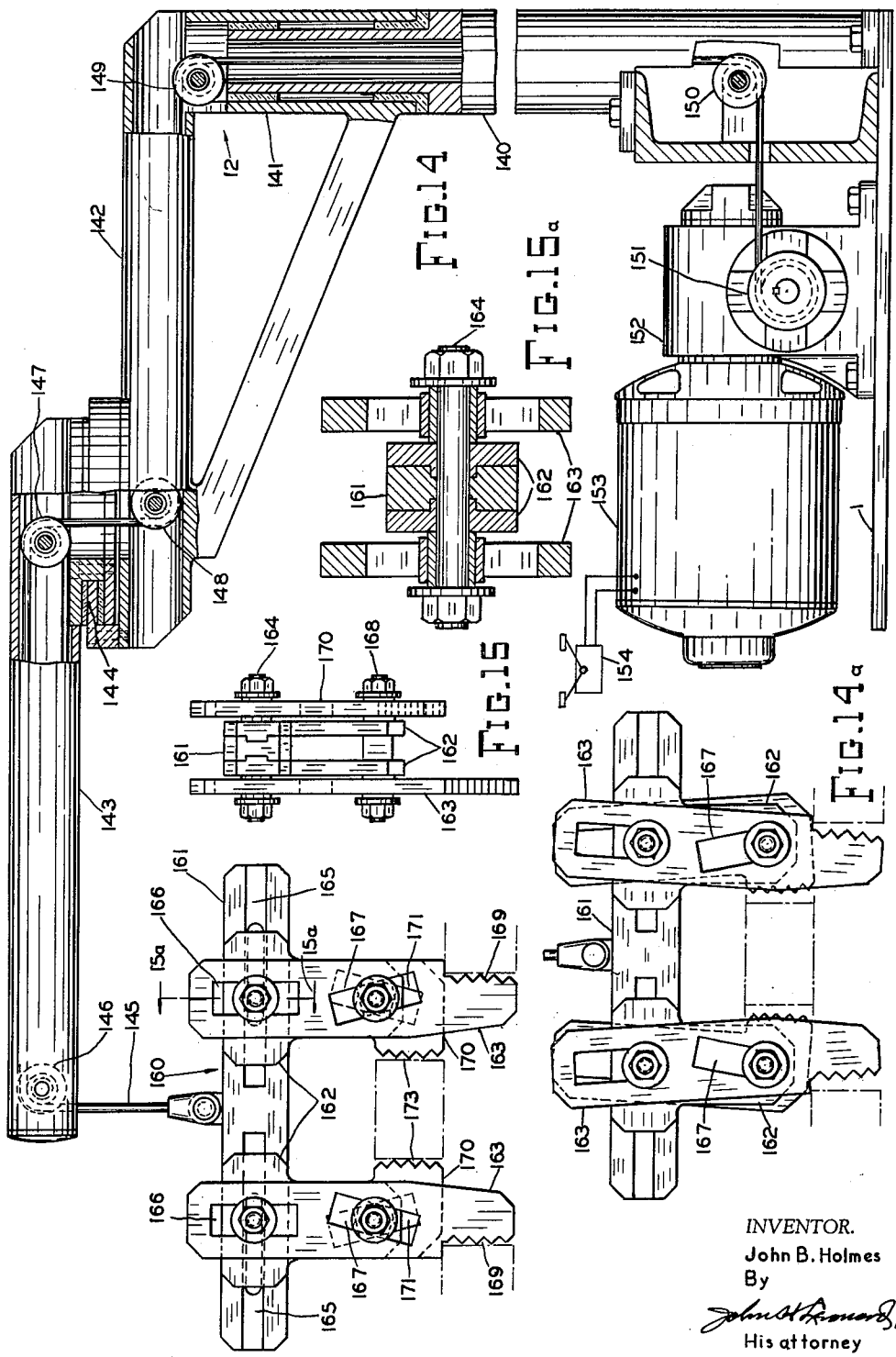

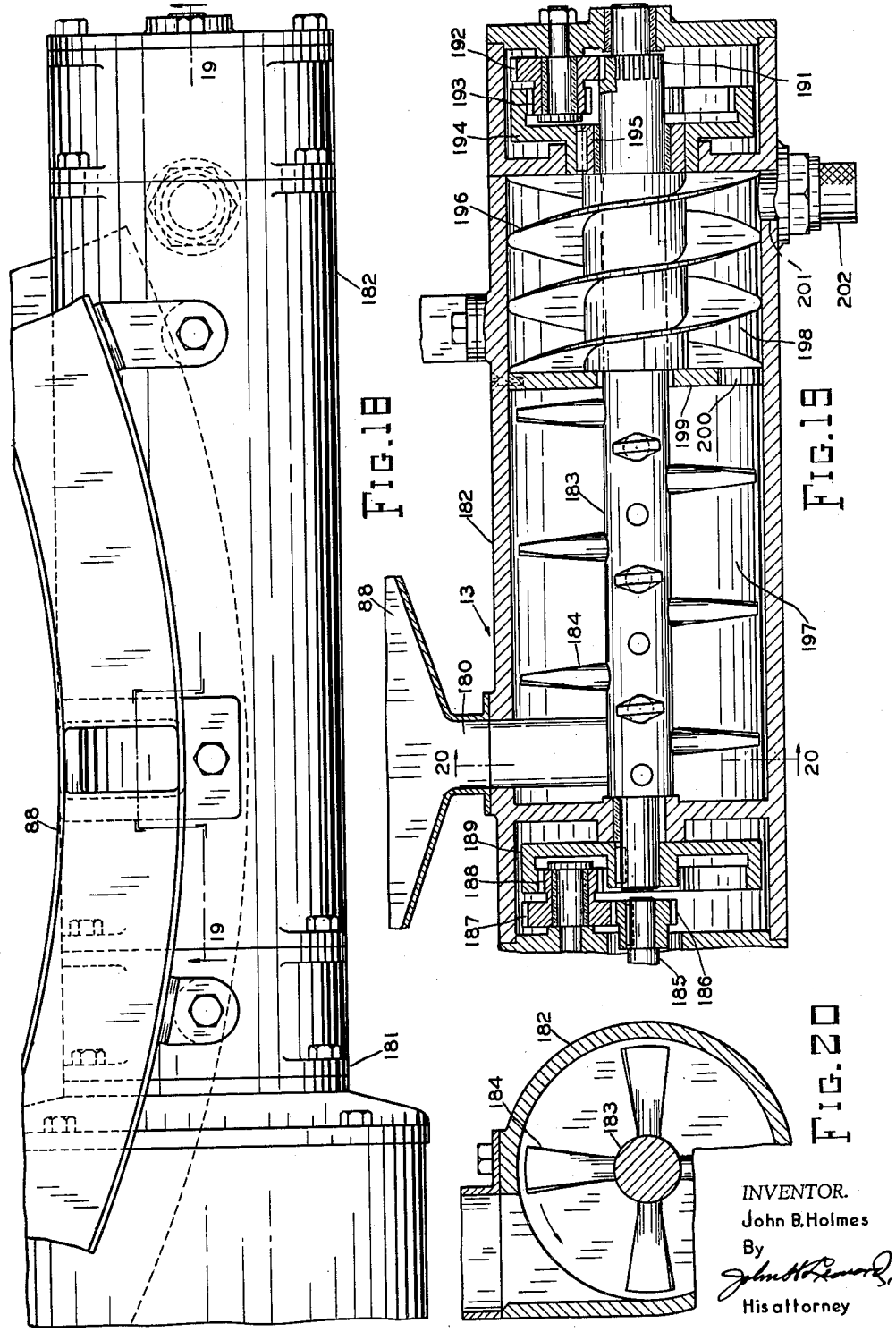

June 19, 1962 J. B. HOLMES 3,039,233
APPARATUS FOR LAYING BUILDING BLOCKS
Filed Dec. 30, 1958 15 Sheets-Sheet 12

INVENTOR.
John B. Holmes
By
His attorney

INVENTOR.
John B. Holmes

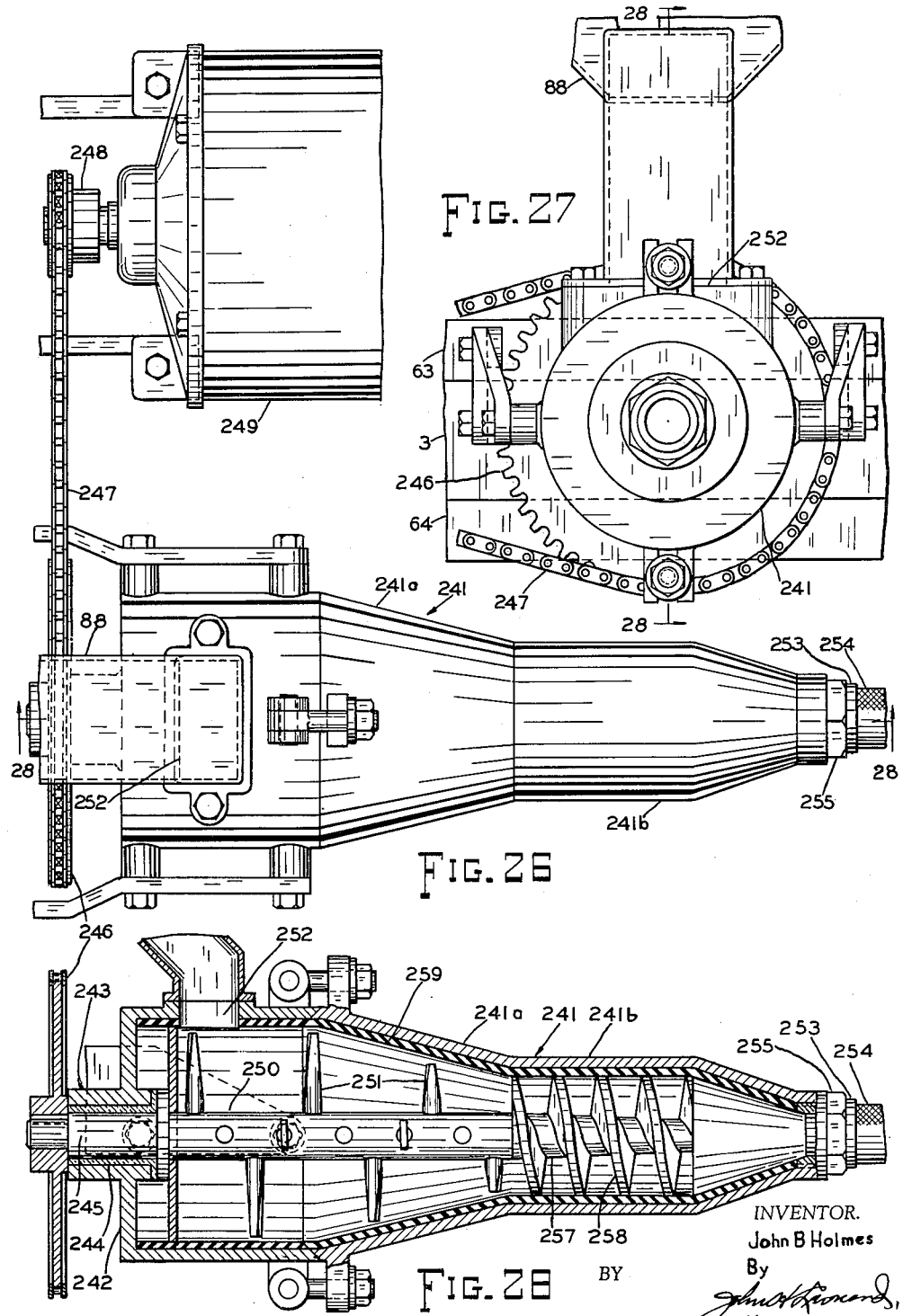

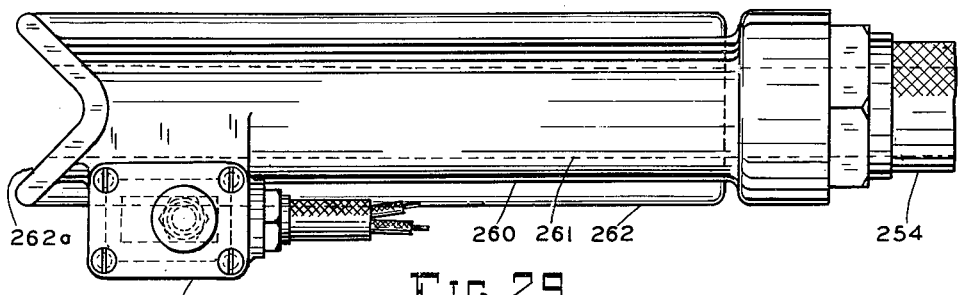
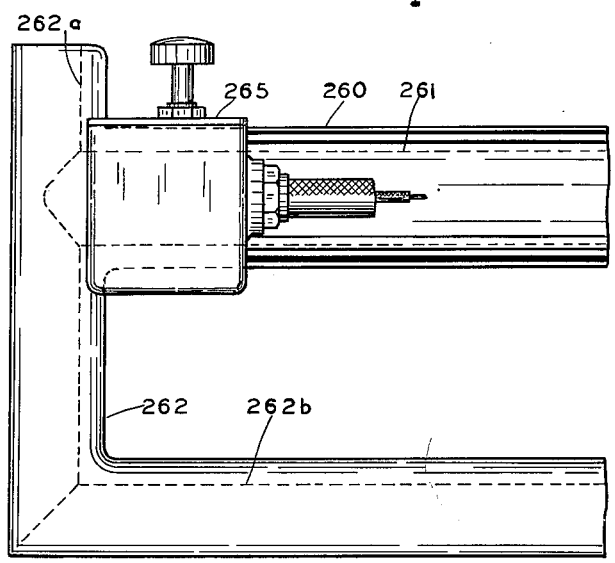
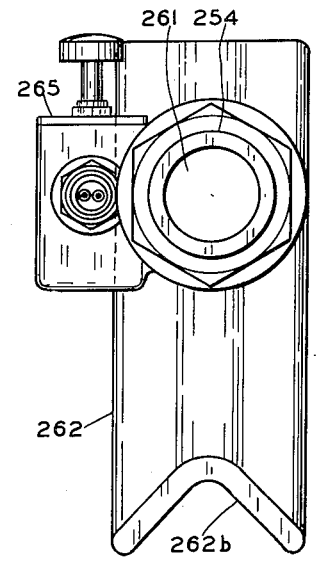
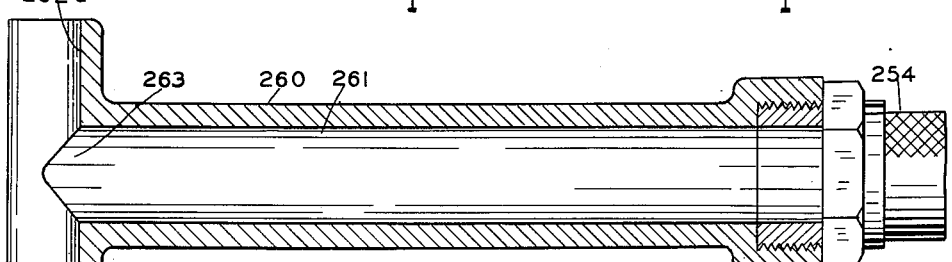
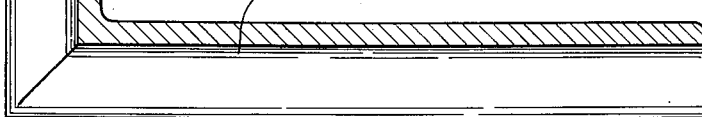

United States Patent Office 3,039,233
Patented June 19, 1962

3,039,233
APPARATUS FOR LAYING BUILDING BLOCKS
John B. Holmes, R.D. 1, Burton, Ohio, assignor of ten percent to Philip R. Mather, Boston, Mass.
Filed Dec. 30, 1958, Ser. No. 783,946
10 Claims. (Cl. 50—538)

This invention relates to an apparatus for laying building blocks, and particularly to an apparatus for laying bricks, cement blocks, stones, and like building blocks, in running courses in which the blocks are bonded together by mortar.

For the purposes of illustration, the invention will be described as applied to the building of basement walls in which it has special advantages, its uses and advantages in connection with other types of structures built of blocks so bonded in running courses being readily apparent from the illustrative example.

Heretofore, in the building of basement walls, the conventional practice has been to dig the basement, to pour a footing, and then, after the footing has set, to lay up the wall by hand. Two average size basements can be dug in half a day, using a conventional power driven back-hoe excavator. However, because of the hazards of leaving the excavations open with unsupported banks or sides for considerable periods, this type of equipment cannot be used to its full capacity unless a very large crew of masons is available to lay up the walls promptly therein. For example, rain, freezing, thawing, and other weather conditions are apt to cause the banks or sides to cave in before or during wall construction. But a crew of four to six masons take at least two days to lay up the average basement wall by hand. Thus the weather and masonry work, unless a very large number of crews are available, combine to reduce the building speed of an entire home building development to an extent that the excavating equipment and other construction services and facilities cannot be used to their fullest extent.

With the present machine, a total time of laying up an average size basement is reduced to about from one-fourth to one-sixth of the time required by hand masonry. Consequently, basement walls can be laid up at a rate more nearly commensurate with the rate of excavation, and the entire construction project can be speeded up.

Furthermore, there is a large reduction in the number of men required, one man, with unskilled assistants and using the present machine, being capable of completing the job in only a fraction of the time required by a sizeable crew of masons, with skilled assistants, using hand methods.

As an example of the advantages of the present machine, a basement can be dug in the morning and, in the afternoon, the footings can be poured and the lines set for the next morning's block laying. That same afternoon the present machine can be brought to the site, together with a load of blocks and mortar materials, and set in position ready to begin the next morning's work. One mason, with the machine, can lay a complete basement wall by noon of the morning on which it is begun, whereupon the machine can be moved to the next succeeding site, and a second wall can be completed there.

By employing two semi-trailers supplying blocks and arranged so that they can be positioned by the machine for unloading directly thereinto, a continuous procedure can be practiced, one semi-trailer being used for transit of blocks while the other is being unloaded into the machine, and the machine itself being shifted to new sites as footings become set. Thus the rate of wall building and rate of excavation can proceed concurrently at commensurate speeds so that the equipment and personnel are most efficiently employed, and the excavations are not left open and subject to damage by weather for very long periods.

Another difficulty encountered in the laying of blocks is the fact that the mason must stand alongside the wall and then extend his arms over the wall to lay the blocks in place. Thus he works throughout the day suspending blocks from his extended arms, an overbalanced position which is extremely tiring and which, toward the middle of the afternoon, necessitates his slowing down very greatly in his rate of performance. As the height of the wall increases, he is forced more and more to stand erect and support and move the blocks in this overbalanced position.

With the present invention, a stone mason or brick layer remains seated in a comfortable position at the work site, being transported alongside the wall in a fixed relation to work progression, the blocks and mortar are delivered to him by suitable power operated means, and, by a hoist conveniently located on the machine, he can cause each block to be gripped, lifted, and held suspended while he moves it into position in the wall, its entire weight being supported by the hoist during the operation.

The present machine comprises essentially an operator supporting platform movable bodily, both vertically and horizontally, to any preselected position in a three dimensional space to be defined by the wall, the platform being maintained level during these movements.

The blocks to be laid are delivered by the machine to the platform in a convenient and readily accessible position for removal by the operator at the rate required for efficient laying of the wall. The mortar also is supplied from the machine to the platform in a condition and at a position suitable for use.

The entire machine may be controlled by suitable controls located on the platform so that the operator himself may manipulate the platform to the position required. If desired, the platform, by means of suitable controls, can be made to follow the side face of the wall at a speed commensurate with efficient wall laying, thus freeing the mason from any manipulation of the machine.

Power hoist means are provided on the platform for gripping the blocks, hoisting them, and then suspending them in a condition such that each can readily be moved by hand into position above its final positions in the wall, and then lowered by the hoist means into final position in the wall.

Further, the mortar is supplied to the mason through a suitable hand controlled extrusion nozzle which can be operated readily to extrude the mortar into the position required, thus dispensing with the usual hand trowelling.

Various other objects and advantages of the invention will become apparent from the following description wherein reference is made to the drawings, in which:

FIGS. 1 and 2 are a front elevation and top plan view, respectively, of a machine embodying the principles of the present invention, showing the same in relation to a basement wall being laid;

FIGS. 3 and 4 are an enlarged fragmentary top plan view and a front elevation, respectively, of the left-hand portion of the machine illustrated in FIGS. 1 and 2, illustrating the manner in which the main supporting boom is manipulated and in which material is fed to the conveyer thereon;

FIG. 5 is a fragmentary sectional view taken on the lines 5—5 in FIG. 3;

FIG. 6 is an enlarged fragmentary sectional view taken on the lines 6—6 of FIG. 4;

FIG. 7 is an enlarged fragmentary top plan view of the right-hand end of the boom illustrated in FIGS. 1 and 2, showing the support for the operator's platform thereon, the supported platform being omitted for clearness in illustration;

FIG. 8 is a front elevation, partly in section, of the structure illustrated in FIG. 7;

FIG. 9 is an enlarged fragmentary sectional view taken on the line 9—9 in FIG. 7;

FIG. 10 is an enlarged top plan view of the operator's platform;

FIG. 11 is an enlarged fragmentary side elevation of the structure illustrated in FIG. 10;

FIG. 12 is an enlarged fragmentary vertical sectional view taken on the line 12—12 in FIG. 10, illustrating a feature of the rotatable support for the operator's platform;

FIG. 13 is an enlarged front elevation, partly in section, of a control for stopping the blocks in position on the operator's platform;

FIGS. 14 and 14a are, respectively, a side elevation, partly in section, illustrating the hoist of the present machine, and a front elevation of the gripping head;

FIGS. 15 and 15a are, respectively, a side elevation of the gripping head of the hoist and an enlarged fragmentary vertical cross sectional view taken on the line 15a—15a of FIG. 14;

FIG. 18 is a top plan view of the mortar mixing and extrusion device of the present invention;

FIG. 19 is a vertical sectional view taken on the line 19—19 in FIG. 18;

FIG. 20 is a fragmentary vertical cross sectional view taken on the line 20—20 in FIG. 19;

FIGS. 26 and 27 are an enlarged top plan view and right end elevation, respectively, of a modified form of mortar mixing and extruding device used in connection with the present invention;

FIG. 28 is a vertical sectional view taken on the line 28—28 in FIGS. 26 and 27, respectively;

Figure 16:
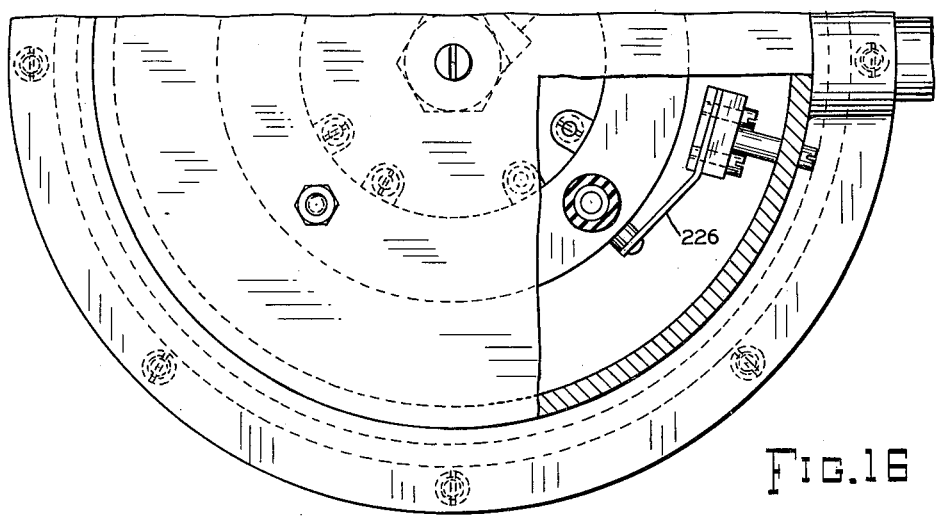
FIG. 16 is a fragmentary top plan view of a commutator used in connection with the present invention, part thereof being shown in section for clearness in illustration.
Figure 17:
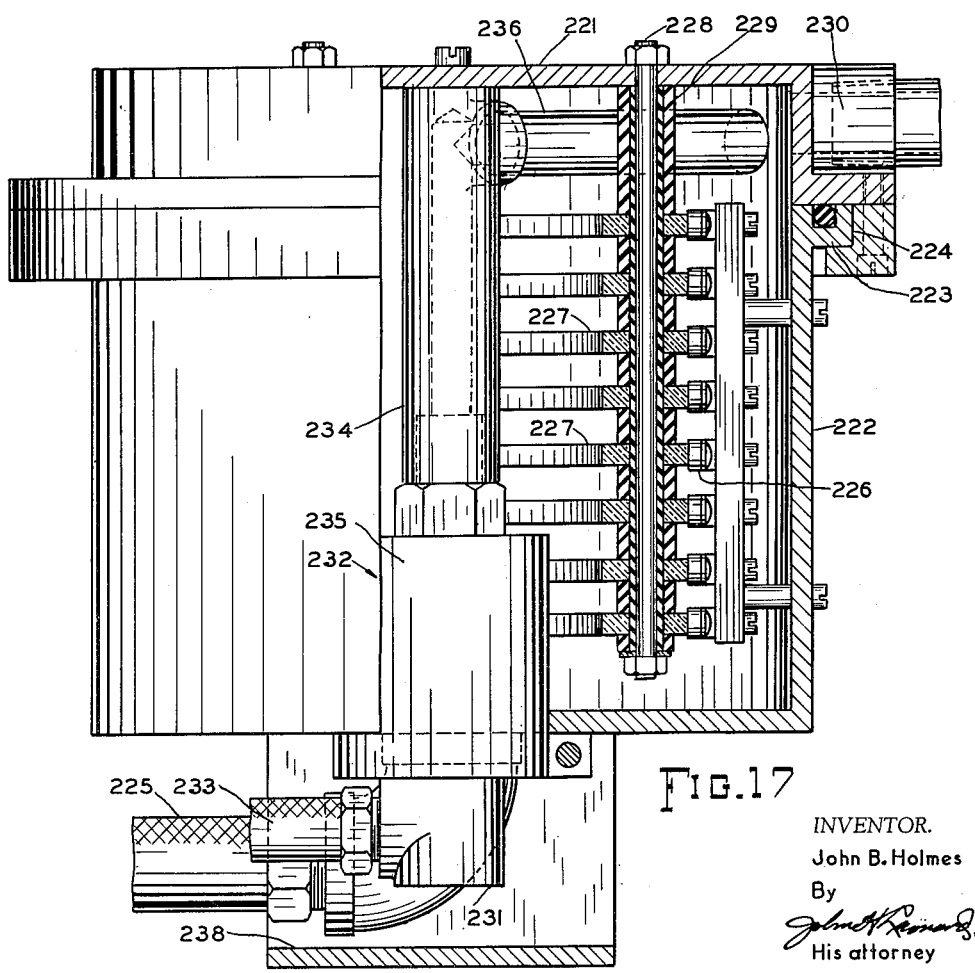
FIG. 17 is a side elevation, partly in section, of the commutator illustrated in FIG. 16.

FIGS. 29, 30 and 31 are an enlarged top plan view, front elevation, and right end elevation, respectively, of the mortar applying nozzle of the present extruding device; and FIG. 32 is a vertical sectional view of the nozzle and is taken on the line 32—32 of FIGS. 29 and 31.

For the purposes of illustration, the invention is shown in connection with the laying of a running rectangular course of basement wall, its use in connection with walls up to one or one and one half stories high above the ground being readily apparent from the illustrative example.

The invention comprises essentially an operator's platform 1 provided with a seat 2 on which a mason may remain seated during manipulation of the apparatus and the laying up of the wall. The apparatus is so arranged that the blocks and mortar are delivered to the mason on the platform by means later to be described. While the mason remains seated on the seat 2, the platform is moved about to positions necessary for the laying of the wall, preferably being moved unidirectionally in successive closed circuits along a path adjacent the lines of the wall to be built.

For this purpose, the platform 1 is arranged to be moved independently vertically and horizontally so as to reach any position desired in a three dimensional space approximating that defined by the proposed wall. In order to obtain these various positions, the platform 1 is supported from a turntable 3 which, in turn, is carried by a suspended boom 4, the suspended boom 4 being suspended from one end of a main boom 5. The main boom 5, in turn, is supported in a suitable guide 6 so as to be slidable endwise thereof. The guide 6, in turn, is mounted on a turntable 7 which is rotatable about an upright axis and is supported thereon for rocking movement about a horizontal axis. The turntable 7 is mounted on a suitable support 8. By virtue of these combined movements, it is apparent that the platform 1 can be lifted and lowered to any desired level. At the same time, and at all of these levels, the platform 1 can be moved horizontally to any position within the ground pattern necessary for the wall to be laid. The horizontal movements are obtained by virtue of horizontal components effected by extension and retraction of the boom 5, by the rotation of the turntable 7, and by rotation of the platform 1 itself about the vertical axis of the turntable 3.

The different elevations are obtained by virtue of vertical components effected by rocking of the boom 5 with its guide 6 about a horizontal axis in all relative rotated positions of the turntable 7, and by extension and retraction of the boom 5 while the boom is in non-horizontal positions.

It is desirable, of course, that the platform 1 remain substantially horizontal regardless of the angularity of the boom 5 with respect to the horizontal, and for this purpose the suspended boom 4 is connected to the end of the boom 5 for rocking about a horizontal axis. This permits the angular relation of the longitudinal axis of the boom 5 and the vertical axis of the turntable 3 to be changed for permitting the platform 1 to remain horizontal regardless of the angularity with the horizontal of the main boom 5.

A conveyor 9 is carried by the main boom and is arranged to have the blocks to be laid deposited on it at a place remote from the platform 1, and to transport these blocks to the outer end of the boom 5. At the outer end of the boom 5 is a lowering conveyer mechanism 10 which receives the blocks, lowers them to a lowered position in which it deposits them on a suitable conveyer 11 on the operator's platform. The conveyer 11, in turn, delivers them to a position adjacent to the operator wherein they are readily accessible for removal by the operator. A suitable articulated hoist 12 is provided on the platform 1 and is arranged so that it can readily be caused to grip each block, successively, and hoist it and support it for ease in manipulation into position on the wall.

A suitable mortar mixing device 13 is provided and supplies mortar to the operator on the platform 1 through a suitable extrusion nozzle so arranged that it can be moved to the positions desired for applying the mortar directly in final position, thus dispensing with the use of trowels and the like.

Controls are provided so that the feeding of the blocks is correlated to the rate of removal thereof from the platform 3 by the operator. Likewise, the mortar material is supplied at a rate commensurate with the use and requirements of the operator. Both the blocks and the mortar material preferably are supplied onto the conveyer 9 adjacent the turntable 7, which is remote from the operator's location, and are delivered to the operator in sequence at the proper speed and in the proper quantities for the efficient handling thereof.

Referring more specifically to the various operating parts of the machine, for convenience in shifting the equipment from place to place, the entire structure is permanently mounted on its own trailer 20. In the form illustrated, the trailer comprises a wheel supported bed 21 on which are a plurality of hydraulic jacks 22 which support one of the non-rotating supports 8 of the turntable 7. Thus, by manipulation of the hydraulic jacks 22, the rotational axis of the turntable 7 can be adjusted so that it may be vertical despite the fact that the ground on which the trailer is supported is not level. The turntable 7 is mounted for rotation on the support 8 on suitable bearings 24. The turntable 7 carries a driving gear 25 which is driven by a hydraulic motor 26 so as to rotate relative to the turntable 7. The gear 25 is in mesh with a stationary ring gear 27 secured in fixed position on the stationary support 8. Thus, by operation of the hydraulic motor 26, the turntable 7 can be rotated to various positions about its axis.

For rocking of the guide 6 about a horizontal axis in all rotated positions of the turntable 7, the guide 6 is provided with suitable trunnions 30 which are received in brackets 31 on the turntable 7. The trunnions 30 and brackets 31 support the guide 6 for rocking about the horizontal axis of the trunnions in all relatively rotated positions of the turntable.

For rocking the guide 6 to different positions, a suitable hydraulic piston and cylinder assemblage 32, including a cylinder 33 and a piston 34 having a rod 35, is provided. The piston rod 35 is pivotally connected to a suitable bracket 36 on the turntable 7. The cylinder assemblage 32 is connected to the guide 6 by means of a suitable pivot 37 so that the assemblage 32 may rock and compensate for the change in alignment of the piston and cylinder assemblage relative to the guide 6 and turntable 7 during rocking of the guide 6.

The main boom 5 is mounted in the guide 6 for movement longitudinally thereof. For this purpose, the main boom is provided with suitable trackways 40 which are in engagement with rollers 41 on the guide 6, thus antifrictionally supporting the boom for endwise movement relative to and in the guide 6.

For moving the boom endwise, the boom is provided with a longitudinal rack 42 which is in fixed position thereon and which is engaged by a suitable pinion 43. The pinion 43, in turn, is mounted on a shaft 44 of a suitable reduction gearing 45 which is driven, in turn, by a suitable reversible motor 46, the motor 46 preferably being an hydraulic motor. Thus, by operation of the motor 46, the boom 5 may be extended or retracted as desired relative to the vertical axis of the turntable 7 in all relatively rocked positions of the guide 6 and in all rotated positions of the turntable 7.

As mentioned, it is desirable that the platform 1 be maintained level while moved to its different operating positions. For this purpose, there is mounted on the outer end of the boom 5 a suspended boom 50 which extends generally vertical but has its longitudinal axis adjustable to different positions relative to the longitudinal axis of the boom 5. For example, the upper end of the suspended boom is connected to the outer end of the boom 5 for rocking about a horizontal axis.

In the form illustrated, this connection is by means of a crank 51 which is mounted on the outer end of the boom 5 for rocking about the axis of a shaft 52. One arm 53 of the crank is rigidly connected to the suspended boom 50 and supports the same. The other arm 54 of the crank is connected to a power means by virtue of which the crank may be rocked. The power means comprises a reversible hydraulic piston and cylinder assemblage 55 having a piston 56, a rod 57 which is pivotally connected at 58 to the arm 54, and a cylinder 59 which is pivotally connected at 60 to the boom 5. By manipulation of the assemblage 55, the angular relation between the suspended boom 50 and the boom 5 can be controlled in such a manner that regardless of the angle which the boom 5 makes with the horizontal, the suspended boom 50 can maintain its vertical position and thereby support the operator's platform in a horizontal position.

As mentioned, the operator's platform 1 is supported on the depending or suspended boom 50 through the intermediary of a turntable 3. As best illustrated in FIGS. 11 and 12, the suspended boom 50 supports at its lower end a supporting plate 62 which is in the form of an annulus having at its inner periphery a race for suitable ball bearings 61. The turntable 3 comprises upper and lower plates 63 and 64 secured together by a suitable cylindrical portion 65. The plates 63 and 64 have complementary races for the balls 61. One of the plates, for example, the plate 63, is provided with an internal gear 66 which is connected to a driving pinion gear 67, the pinion gear, in turn, being driven, through an idler 67a, by a suitable shaft 68 coaxial with and driven by a motor 69. The motor 69 is reversible and hydraulic. Thus, in addition to the movement of the platform 1 by manipulation of the boom 5, guide 6, and turntable 7, the platform 1 also can be swung, relative to the boom 5, about an upright axis so as to dispose the working portion occupied by the operator in different positions, even while the main boom is held in a fixed position. By the concurrent manipulation of these motion producing parts of the machine so as to combine the various components of movement provided by them, the operator's platform at the operating portion is substantially movable bodily universally to any location within a three dimensional space corresponding within broad limits and tolerances with the three dimensional space to be defined by the wall.

The next problem after the manipulation and operation to position the operator in the position desired, is to supply to him the necessary blocks and mortar. For this purpose, there is provided on the trailer 20, in superposed spaced relation to the boom 5, a suitable feed hopper 70 which is adapted to hold loose material, such as a dry mortar mix. Mounted on the boom 5 and extending endwise thereof is an endless conveyer 71 in the form of a rubber or flexible belt which passes at one end of the boom about a suitable drum 72 and at the other end about a drum 73. The drum 73 is preferably rotatable on the shaft 52 which rockably supports the suspended boom 50. The drum 72 is driven by a suitable sprocket 74 which, in turn, is driven through the medium of a chain 75 by a driving sprocket 76. The driving sprocket 76, in turn, is driven by a suitable motor 77. The motor 77 may be an electric or hydraulic motor, as desired, and, for illustration, is shown as a hydraulic motor. The belt is accessible at its upper surface for the reception of material at its left-hand end portion, in FIG. 1, in the most extended position of the boom 5 to the right, which position is approximately the position shown in FIG. 1. The blocks can be laid by workmen on the conveyer 71, or skidded down a chute thereonto, the chute, in turn, being loaded at a more remote location. The manner of loading the belt with the blocks is relatively unimportant, although they should be spaced approximately a uniform distance from each other thereon.

In order to supply the mortar to the operator on the platform 1, the conveyer 71 is provided along one of its margins with upright ribs 78 which are spaced apart laterally of the belt a short distance from each other and thereby define a small trough 79 extending endwise of the belt. The inboard one of the ribs 78 also forms a suitable stop against which to lay the blocks so that they are well aligned transversely of the belt. The trough 79 is positioned to pass beneath a spout 80 of the hopper 70. As best illustrated in FIG. 6, the spout 80 has, at its lower end, a telescopic sleeve 81 of which the lower end can be adjusted to different spaced relations above the belt. In the form illustrated, this adjustment is effected by means of a diagonal slot 82 through which extends a bolt 83 which can be tightened after the sleeve has been rotated about the upright axis so as to adjust the spacing. The sleeve is of less width than the trough 79 and preferably is disposed so that its lower end lies below the level of the top of the ribs. The amount of material fed per unit length of conveyer 71 depends upon the spacing of the lower end of the sleeve 81 above the base of the trough 79, as is apparent from FIG. 6. Ordinarily this is regulated so that substantially the amount of mortar is that required for laying the number of blocks supplied on the belt, or slightly in excess thereof. Thus, with the belt driven so that the upper face of the belt moves to the right in FIGS. 1 and 4, the blocks and the mortar mix are fed from the left end of the boom 5 to the right end.

Referring next to FIG. 8, at the right end of the boom there is provided on the arm 53 a receiving stand or table 85 onto which the blocks pass as they leave the conveyer 71. The upper surface of the table 85 is substantially tangent to the conveyer. Furthermore, a suitable chute 86 on the arm 53 is arranged to receive the contents from the trough 79 and discharge it downwardly through a suitable discharge spout 87 into an annular receiving bin 88. The bin 88 is in the form of an annular trough which is open at the top and has a bottom which slopes gradually upwardly in both directions from the lowermost portion 89 to a highermost portion 90, this slope being gradual throughout the length of the bottom.

At the lowest portion of the bottom of the bin is a cement or mortar mixing device 13 which, with the bin 88, rotates with the turntable 3. Since it is desired to extrude the mortar into place in the wall, the dry mix of mortar is fed into the trough 79, the same machine 13 being used for mixing the motar and for extruding it. However, if desired, wet ready mixed mortar may be fed into the trough 79 from the hopper 70 and transported in like manner to the operator's position and thereupon passed into a suitable machine for extrusion onto the wall and the blocks where desired.

In order to deliver the blocks to the operator's platform after they reach the end of the conveyer 71, a suitable elevator mechanism is provided. In the form illustrated, this elevator mechanism comprises two sets of endless chains 92 which, at their upper and lower ends, pass around sprockets 93. The upper sprockets 93 are arranged in pairs on shafts 94, respectively. The shafts 94, at their ends, are provided with gears 95 which are in mesh with suitable intermediate gears 96 which, in turn, are arranged on a shaft 97 and are drivingly connected to a main driving gear 98 of a suitable hydraulic motor 99. Thus, the shaft 97 synchronizes the rate of travel of the endless chains 92, so that they travel at the same speed. Each pair of chains on the same shaft carries fragmentary shelves 100, these shelves being spaced apart from each other in a direction transversely of the conveyer 71 so as to receive the blocks from the table 85. The chains or conveyers 92 are driven in timed relation to each other so that each shelf comprises one shelf portion on each set of chains, and these portions are coplanar when in block receiving position.

Each block deposited on the table 85 is pushed by the next block into a position so that it rests at one end on one of the shelf portions 100 and at the opposite end on the coplanar shelf portion 100, and is thus ready for lowering. As each pair of coplanar shelf portions 100 reaches the proper position, the portions strike a stop 101 which is mounted on the supporting frame of the elevator mechanism. Two stops are provided, one for each of the shelf portions of the pair.

The stops 101 are connected with rocker arms 102 mounted on a rock shaft 103. Arranged between the pair of coplanar shelf portions is a control roller 110 which is supported on a rocker arm 111 which is rotatable with the shaft 103. The motor 99 is continuously driven at light yielding hydraulic pressure so that when the shelves 100 strike the stops, the elevator 10 is stopped and the motor 99 is stopped, but, due to the continued application of its pressure, it yieldably urges the elevator in the block lowering direction.

When a block strikes the roller 110, it thereby withdraws the stops 101 which releases the elevator so that the elevator is driven in the block lowering direction by the motor 99 and the weight of the block. As soon as the block clears the roller 110, the shaft 103 is released and the stops are moved back to stopping position. For returning the stops to stopping position, a suitable spring operated push rod 113 operated by an enclosed spring 114 is provided. After the stops 101 return to stopping position, the elevator continues to operate until the next succeeding shelves 100 engage the stops.

In order to prevent the conveyer 71 from feeding blocks onto the elevator 10 before the shelves 100 are in the proper receiving position, a normally open limit switch 115 is provided so that it is engaged by one of the shelves 100 when the shelf engages a stop 101. Engagement of the switch 115 by a shelf 100 closes the switch and operates a control valve for starting the motor 77 of the main conveyer 71. Thereupon, a block is delivered onto the shelves which have been stopped in the proper position for reception thereof. Movement of the block onto the shelf again moves the roller 110 to the right, withdrawing the stops and allowing the shelves 100 to move downwardly. Slight downward movement of the shelves 100 releases the limit switch 115 so that it opens the circuit to control valve of the motor 77 and stops the main conveyer 71 which remains stopped until the next succeeding shelves 100 are in proper block receiving position.

The motor 77, being a hydraulic motor, is controlled by a suitable solenoid operated valve 116 which is normally held in off position by means of a spring 116r and is moved to position to operate the motor 77 by means of energization of the solenoid winding 116s.

The operator's platform 1 is supported from the underside of the turntable 3 by a post 121, and on this platform is mounted an endless conveyer 122, in the form of an endless belt. The conveyer 122 is driven by passing it around a suitable drum 123 driven through a sprocket 124 by means of a chain 125 which, in turn, is driven by a sprocket 126 of a suitable electric motor 127. A suitable idler drum 128 is arranged at the opposite end of the conveyer 122 and idler drums 129 are disposed therebeneath, so as to afford space beneath the belt at the location of the drums 129 for a commutator later to be described.

At the lower end, the sprockets 93 of the chains 92 are arranged a sufficient distance above the belt or conveyer 122 to permit a block being lowered by the elevator chains 92 to drop onto the conveyer free of the elevator. Thus, the blocks lowered by the elevator mechanism drop onto the conveyer 122 and, by it, are conveyed to a position in which they can readily be removed by an operator in seated position.

As illustrated in FIG. 13, near the operator's position is a suitable control switch 130 for the motor 127. The switch 130 is operated by a rocker arm 131 which is pivotally connected at 132 to a stationary part of the platform 1. The upper end of the rocker arm carries a rod 134 which is positioned so that it will be engaged by the end of a block being moved by the conveyer 122 toward the position in which it is to be disposed for removal by the operator. The switch 130 and rod 134 are so related that when a block is moved to the proper position, the block engages and swings the arm 131 to the right, thus operating the switch 130 to stop the motor 127. The switch is a self-restoring type, as also is the arm 131, so that, when the block is removed from the conveyer 122, the arm 131 assumes its original position preparatory to engagement and operation by the next succeeding block.

The seat 2 is mounted on the platform 1 and is positioned so that the operator can remain seated at the location necessary for effective operation. The seat 2 is carried on an arm 136 which, in turn, at the end opposite from the seat, is mounted on an upright post 137 for swinging to the different positions about an upright axis.

Also carried on the platform 1 is a hoist 12, heretofore referred to. The hoist 12 comprises an upright hollow post 140 which is mounted at its base on the platform 3 and extends upwardly therefrom. At the upper end of the post is a cooperating sleeve 141 to which, at its upper end, is connected a tubular overhanging inner arm 142. The sleeve 141 is mounted for rotation about the common axis of the sleeve 141 and the post 140. Mounted on the outer end of the inner arm 142 is a forearm 143, the arms 143 and 142 being connected together, as indicated at 144, for swivelling relative to each other about an upright axis. By virtue of the swivelling of the forearm and the rotation of the sleeve 141 about the upright axis of the post 140, the outer end of the forearm 143 can readily be moved to substantially any position desired in a horizontal plane. In order to hoist the block, a suitable cable 145 is provided, the cable 145 passing over suitable pulleys 146, 147, 148, 149 and 150. It is to be noted that the pulleys are so arranged that the axis of the cable at the swivel connection 144 is coincident with the axis of the connection itself, and the axis of the cable at the pulley 149 is coincident with the axis of the sleeve 141. The pulley 150 leads from the post to a suitable winding drum 151 which is driven through a reduction gear transmission 152 by a reversible electric motor 153. The motor 153, in turn, is controlled by the operator through a reversing foot switch 154. Thus, by operation of the switch 154, the cable can be payed out or reeled up in all relatively swivelled positions of the forearm 143, arm 142, and sleeve 141.

For gripping the blocks, there is attached to the end of the cable 145 a gripper indicated generally at 160. This gripper comprises a cross bar 161 having movable depending portions 162. Pivotally connected to the cross bar 161 are links 163. The links are secured to the cross bar by suitable bolts 164, with bushings, which are adjustable to different positions along elongated slots 165 for cooperating with different sizes of blocks. The links are secured in their adjusted positions for swinging about the axes of the bolts 164, respectively. The links are provided with elongated slots 166 by virtue of which they can float endwise of the slots 166 relative to the support 161 in all relatively rotated positions about the bolts 164. Near their lower ends, the links are provided with elongated slots 167 which slope outwardly downwardly and in which bolts 168, carried on the portions 162, are slidable radially. Thus, upon hoisting of the cable 145 and lifting of the cross bar 161, the bolts 168 cooperating with the slots 167 spread the links 162 outwardly from each other. The lower ends of the links 162 are adapted to be received within the passages of a hollow block and have outwardly facing serrated faces 169. When the links are lifted, they are caused to spread apart by the bolts 168 and grip the walls of the block passages sufficiently tightly to suspend the block.

In like manner, clamping links 170 having slots 171 are floatingly mounted on the bolts 164. The links 170, by this arrangement, are caused to move inwardly toward each other upon lifting of the support 161. These links have inner serrated faces 173 arranged to grip the outside of a block and thus hoist it when they are hoisted. As a result, hollow blocks can be gripped on the inside or outside walls and solid blocks on the outside. All that is necessary is that the operator dispose the gripping portions 169 or 172, as the case may be, into slight gripping relation to a block and operate the switch 154 to cause the motor to reel in the cable 145, whereupon the block is gripped, hoisted, and held suspended by the cable 145. Since the suspension is by a cable, the block may be turned to any position desired about the axis of the cable, and since the block is supported thereby horizontally, it can be laid transversely or endwise of the wall or in any intermediate position about an upright axis. Furthermore, due to the swivelling of the forearm 143 and arm 142 at the connection 144, and of the sleeve 141 about the axis of the post 140, the block can be moved bodily to the position in which desired. Concurrently, it can be lifted and lowered at the convenience of the operator. As a result, the operator is relieved from substantially all the weight supporting functions and can very readily, with a minimum expenditure of energy, lift the block, move it to the position desired, and lower it at any speed desired into final position. As each block is removed, another one is replaced at the position from which the former was removed, so that with a little practice the operator can perform the operations semi-automatically without diverting his attention to the actual picking up and hoisting of a block. All of his attention can be given to applying mortar and positioning the block properly in the wall.

Referring next to the manner of supplying mortar to the operator. For the purpose of illustration, the means shown is one which supplies a dry mix of mortar ingredients at the operator's site and then mixes the ingredients and water at that site. This means comprises the chute 89, as described, which discharges into an inlet hopper 180 of the mixer 13. The mixer is driven by a suitable motor 181 which may be hydraulic or electric, as desired, and which may be arranged to be controlled by the operator while seated on the platform, though preferably it is continuously driven.

The mixer comprises a casing 182 mounted on the platform 1 for travel therewith. Within the casing is a rotatable shaft 183 on which are mixing paddles 184. The shaft is driven by the motor 181 through the motor shaft 185, spur gear 186, and reduction gears 187 and 188, co-operating with an internal gear 189 keyed to the shaft 183. The shaft 183 has a gear 191 which drives a reduced speed gear train comprising co-rotatable coaxial reduction gears 192 and 193, the latter of which is in continuous mesh with an internal driving gear 194. Gear 194 is keyed to a sleeve 195 of a screw conveyer, the sleeving having spiral fins 196. The reduction gearing relation is such that the paddles 184 are driven at relatively high speed and the screw 196 at a considerably slower speed. The paddles 184 are arranged in a left-hand compartment in FIG. 19, as indicated at 197, and the screw in the right-hand compartment 198, these compartments being separated by a partition wall 199 in which is an opening 200. The compartment 198 is provided with a discharge opening 201. The water is supplied into the interior of the casing 182 through the hopper 180 in the quantity desired, depending upon the stiffness of the mix required. The pitch of the paddles 184 is such that, at the higher speed, they urge and drive the material to the right or toward the wall 199 while thoroughly mixing the same. This feed is of sufficient force to cause the mixed mortar to pass through the opening 200 in the screws 196 which then forces it through the discharge opening 201. However, the feeding of the mortar by the paddles 184 is not a direct and positive feed as with a continuous screw fin. Instead, since the paddles 184 are spaced apart, should the worm become overloaded due to the prevention of the material passing out of the opening 121 by control of the nozzle, to be described, the paddles 184 will continue to urge the material through the opening 200 with slight pressure, but the mortar will be prevented from entering the compartment 198 by the back pressure resulting from the stopping of the passage of material through the outlet 201. Thus a supply of mortar is continuously mixed and maintained agitated and is in condition to be discharged through the outlet passage 201 whenever that outlet is free for discharge.

Connected at one end to the outlet passage 201 is a flexible hose 202 on the other end of which is a nozzle 203. It is desirable that the nozzle be operable to extrude the mortar into final position where desired, for example, on the upper surface of the ready-laid course of blocks on the upright end walls of the blocks against which a new block is to be laid. The present nozzle is arranged to control the flow of mortar from the outlet 201 and cause it to be extruded either onto a horizontal surface or onto an upright surface. For this purpose, the nozzle comprises a hollow body 203 connected to the hose 202 so as to receive internally the mortar to be discharged through the opening 201. Within the body is a butterfly valve 204 operated, from the exterior of the body, by a flexible cable 205 moved by a spring returned pushbutton 206. Normally, the valve 204 is maintained in closed condition by the return spring 207 of the pushbutton 206. Pressure built up as a result thereof stops the flow through the outlet 201 but does not interfere with the maintenance of the plastic mortar in condition for extrusion in the chambers 197 and 198.

Figures 22, 24:
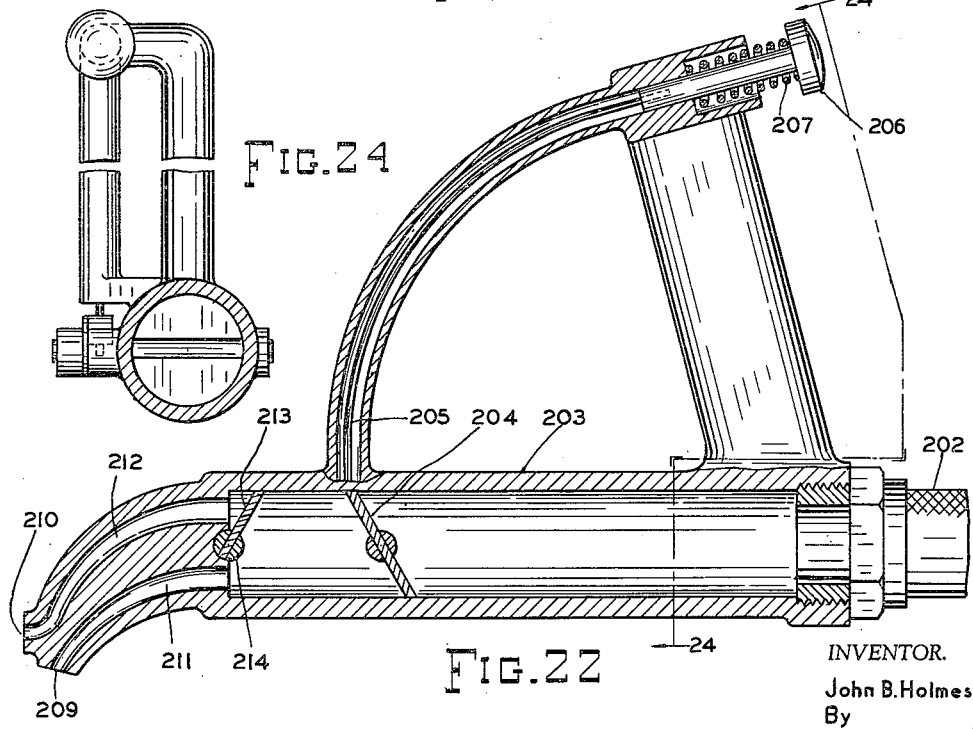
FIG. 22 is a vertical, sectional view of the nozzle, illustrated in FIG. 21.
FIG. 24 is a cross sectional view taken on the line 24—24 of FIG. 22.

At the end of the body 203, opposite from the hose 202, is a downwardly discharging port 209 and an endwise discharging port 210, the former being arranged to discharge mortar on an upwardly exposed surface and the latter on a vertically disposed surface. The orifices 209 and 210 are connected to the interior of the body by suitable ducts 211 and 212, respectively. Arranged in the body adjacent the inlet end of the ducts 211 and 212 is a directional cut-off valve 213 which is mounted on a suitable rock shaft 214 which extends to the outside of the body and is connected to a manually operable wing-nut head 215 by which the valve 213 can be moved from an uppermost position, illustrated by the solid lines, to a lowermost position illustrated by the dotted lines, in FIG. 22. When the valve 213 is in the uppermost position, the mortar will flow through the duct 211 and be discharged from the orifice 209, while, when the valve 213 is moved to the lowermost position, the mortar will flow through the duct 212 and be discharged from the orifice 210. The pressure of the mortar against the valve retains it effectively in the selected one of the positions in which it has been set by the operator. With the valve 213 set in the desired position, the pushbutton 206 can be operated to open and close the valve 204 to the extent desired, thus causing the mortar to be extruded at the rate and in the quantity desired from the selected one of the orifices 209 and 210.

Figure 23:
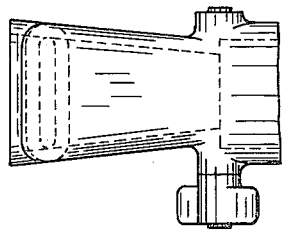
FIG. 23 is a fragmentary top plan view of the forward part of the nozzle, as viewed from a line 23—23 in FIG. 21.
Figure 21:
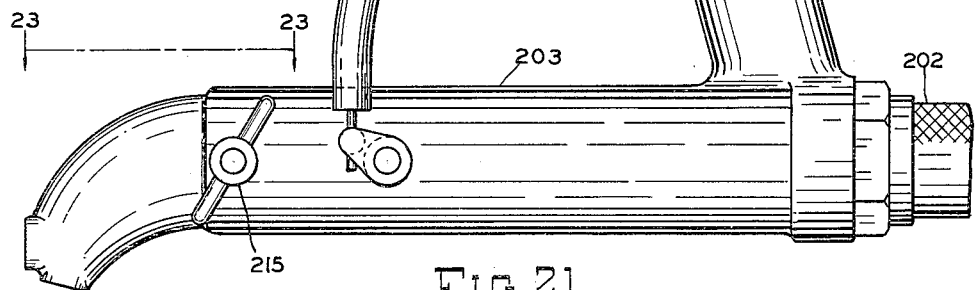
FIG. 21 is an enlarged side elevation of a mortar extruding nozzle of the device illustrated in FIG. 18.

As illustrated in FIG. 23, the orifices are preferably of a sufficient width and thickness so that they dispose onto the blocks a ribbon of mortar such as required for the particular job at hand. Accordingly, the mortar does not have to be trowelled or otherwise additionally manipulated into place by the operator.

At the end of the day's work, however, the mechanism described must be cleaned out and this is done merely by running water into the hopper 180 while disconnecting the hose 202 from the outlet 201 and flushing out the cement. If desired, openings covered by suitable bolted removable covers may be provided along the length of the body 182 for affording access for flushing out the interior thereof. The hose 202 and the nozzle 203 may readily be cleaned by removing them and flushing them out with water.

As heretofore mentioned, it is desirable that all of the operations to be controlled and performed by the operator be performed and controlled by him while he is seated on the platform. For example, he should be able, while so seated, to control the different movements of the various booms, the platforms, the turntables, and, in fact, the movement of all parts except the jacks 22 which do not require adjustment during operation.

Furthermore, it is desirable that as much as possible of the power be supplied from a common hydraulic source. For this purpose, there is provided on the turntable 7 an electric motor 215 which drives the hydraulic pump 216 with the necessary controls, gauges, and the like, for supplying a source of hydraulic pressure of preselected value. This pressure fluid can be supplied through hoses, from an accumulating tank 218 connected to the pump, to the various parts to be operated by hydraulic pressure. Generally, the control is effected by means of conventional solenoid operated control valves of the axially movable spool and ported body type, although any suitable control valves may be used.

However, control by electric signals is desirable, and in order to transmit electric signals from the operator's platform to the various valves and the like, or to make direct electrical connections with suitable electric power therethrough, a commutator 220 is arranged on the platform 1.

As illustrated, the commutator comprises a header 221 rigidly secured in position with respect to the platform 1. Rotatably secured to this housing in depending relation thereto is a housing 222. The housing 222, at its upper margin, has a suitable flange 223 rotatably accommodated in a suitable annular channel 224 provided by the header 221 for supporting the housing 222 for rotation relative to the header 221 about a vertical axis. Connected to the housing 222 is an electric multi-wire cable 225 which leads upwardly into the interior of the housing 222 and of which the wires are connected selectively to suitable brush contacts 226, respectively, which rotate with the housing 222. Mounted in fixed position on the header 221, and thus rotatable relative to the housing 222, are contact slip rings 227 which cooperate with the contacts 226, respectively, for conducting electrical current. The slip rings 227 are supported by suitable bolts 228 and held in proper position by insulators 229. Suitable leads from the slip rings are lead out of the header 221 through the outlet passage 230 to the switches of a suitable control panel located conveniently for the operator.

Mounted on, and in coaxial relation to the axis of rotation of the housing 222, is one element 231 of a union 232 to which is connected a water hose 233. A suitable pipe 234 is connected in fixed position to the header, and a complementary union element 235 is connected to the pipe 234. The elements 232 and 235 are rotatable relative to each other about the axis of rotation of the housing 222. At its upper end, the pipe 234 has a lateral lead 236 which is in fixed position relative to the header 221 and which leads outwardly therefrom through a port 237 to which a suitable hose is connected for supplying water to the mixer 13, the hose having the usual flow control nozzle by which the water can be shut off and turned on, as desired, at the nozzle.

Thus, regardless of the vertical and horizontal position of the platform 1, and its degree of rotation about its upright rotational axis, and the rotation of the main turntable, water and electricity for control or power is supplied to the platform.

As a result of the swivelling connection of the commutator, herein described, the booms can be operated so that the platform can move unidirectionally in successive closed circuits about the basement. This is particularly desirable in laying up courses of blocks, inasmuch as it allows the maximum setting time for each course preparatory to efficient laying thereon of the next succeeding course thereabove, whereas were the operation's direction reversed occasionally some freshly laid courses would have new courses laid thereon before initial setting. Furthermore, the operator is relieved from considerable manipulation of the machine which would occur were it necessary to reverse the direction of travel frequently. During such unidirectional travel, the hose 233 and cable 225 do not become twisted but can drag readily across the surface of the ground accommodating themselves to the position necessary.

A suitable protecting cover plate 238 is provided on the bottom of the housing 222 to guard the connections of the cable 225 and the hose 233. Furthermore, the entire commutator is placed in a guarded position above the lower limit of the platform 1, this being made possible by using the idler pulleys 129 to provide adequate space beneath the underside of the conveyer 122 and the bottom of the platform 1.

Figure 25:
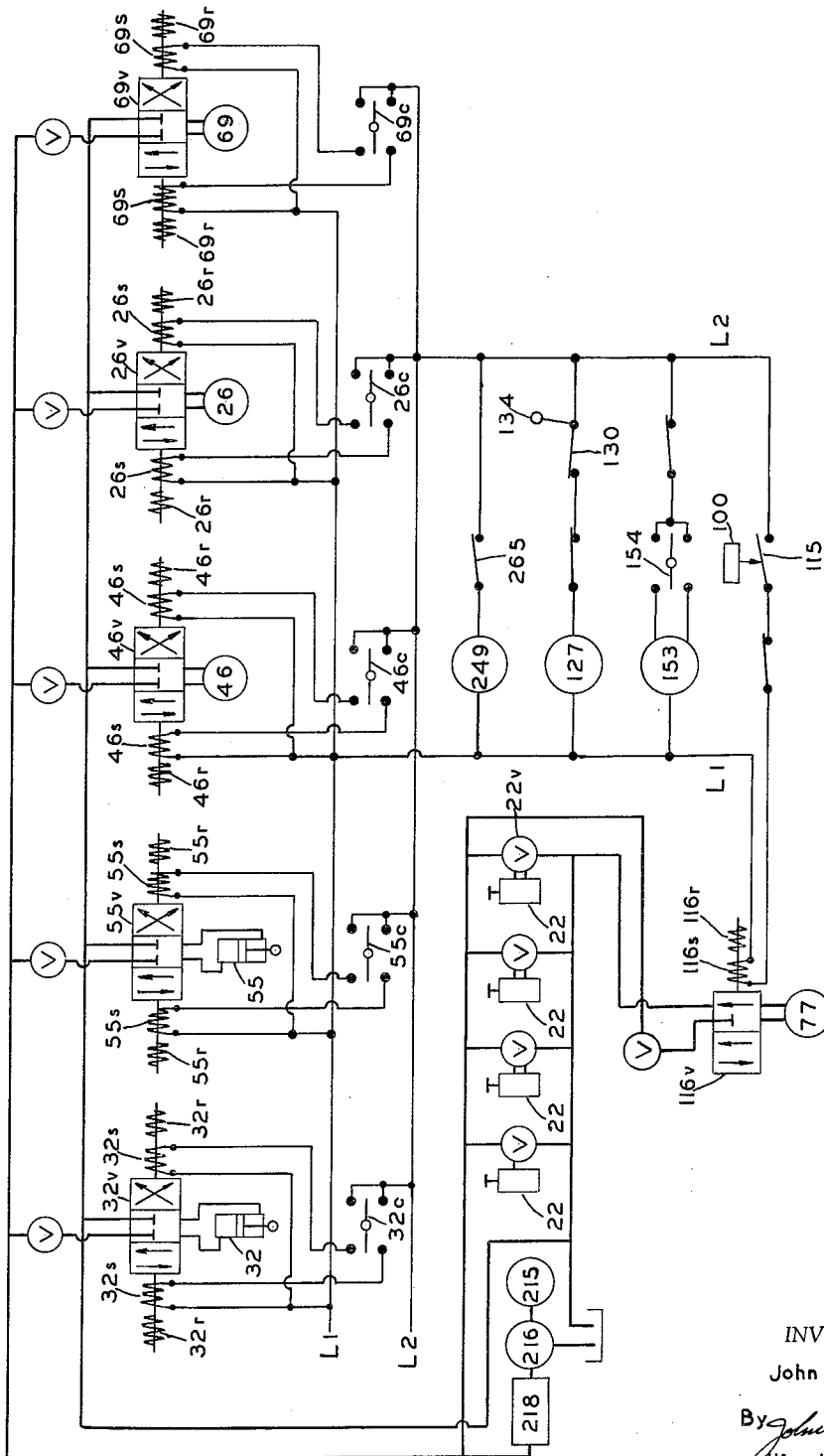
FIG. 25 is a wiring diagram showing the controls used in connection with the present invention.

Referring to the wiring diagram of FIG. 25, it is to be noted that the hydraulic pressure fluid is supplied by the pump 216, driven by the motor 215, to an accumulator 218, and from which it passes through suitable hoses to the locations where it is to be used.

The hydraulic jacks 22 are connected across the hydraulic circuit, as illustrated, each having its own individual, manually controlled, valve 22v which can admit pressure fluid to the lower part of the jack cylinder, or vent the lower part of the cylinder of the sump, or hydraulically block the lower part of the cylinder so as to maintain the jack set at the preselected height. These are hydraulically locked in position at the beginning of the operation and thereafter, until the machine is moved, do not require further adjustment.

For operating the piston and cylinder assemblage 32 for rocking the guide 6, a reversing valve 32v, by which the assemblage can be extended or retracted and hydraulically locked in the position desired, is provided. The valve 32v is remotely operated by solenoids 32s and is returned by springs 32r to the position, illustrated in FIG. 25, in which it locks the guide 6. One of the solenoids 32s sets the valve in one extreme position and the other in the opposite extreme position, thus reversing the connection of the assemblage 32 to the hydraulic circuit. The solenoids 32s are connected to the electric circuit through a reversing control switch 32c which, in one position, energizes one of the solenoids, and, in the opposite position, energizes the other for selectively setting the valve 32v in the extreme positions. In an intermediate position of the switch, the valve 32v hydraulically locks the assemblage 32. The switch 32c is arranged on a panel on the platform and is connected across a power source, indicated by the lines L1 and L2, through selected slip rings on the commutator.

Correspondingly, the assemblage 55 and the motors 46, 26, and 69 are controlled by reversing valves 55v, 46v, 26v, and 69v, respectively, operated by the associated solenoids 55s, 46s, 26s, and 69s, respectively, which are controlled by suitable reversing control switches 55c, 46c, 26c, and 69c, respectively, as illustrated. If desired, the usual manual cutoff control valve may be connected between each solenoid control valve and the pressure side of the hydraulic circuit.

The hydraulic motor 77, operating the main conveyer 71, is connected to a hydraulic control valve 116v operated by a solenoid 116 and returned by a spring 116r. The spring biases the valve so that when the solenoid is energized, the valve is in position for causing operation of the motor 77, and when the solenoid is deenergized, the spring 116r returns the valve to stop the operation of the motor 77. The solenoid is controlled by the self-restoring switch 115 which, when the shelves 100 are in position against the stops 101 for receiving blocks, is engaged and closed by one of the shelves of the elevator, thus starting the conveyer 71 only while the elevator is in the proper position to receive an additional block. When a block is moved onto the elevator, it strikes the roller 110 and thus withdraws the stops 100, and the shelves move downwardly and release the switch 115. The switch 115 thereupon opens, deenergizing the solenoid of the valve 116v which then stops the motor 77. The lowering of the elevator continues until the block on the elevator has cleared the roller 110. As soon as the roller 110 is cleared, the stops are moved back into position, but the main conveyer 71 is not started until the next shelves strike the switch 115 and close it. Each of the other valves 32v, 55v, 46v, 26v, and 69v may have interposed between it and the pressure side of the hydraulic circuit a conventional manual cutoff valve, as indicated, as also may the valve 116v.

Since the platform must rotate unidirectionally, it is difficult to supply hydraulic fluid to it at the same time that water is supplied, inasmuch as both connections would have to be rotatable relative to the platform about the upright rotational axis of the platform. Accordingly, the motor 127, which drives the platform conveyer 122, and the motor 153, which operates the cable hoist 12, are driven electrically.

The motor 127 is connected across the power source through the normally closed switch 130 operated by the rod 134 so that, when a block reaches the proper position on the platform, the switch opens and the motor 127 is stopped and thereby stops the conveyer.

The motor 153 is connected across the power source through the foot-operated reversing switch 154.

The electrical connections, as indicated, are provided with the usual manually operated normally closed switches for disconnecting them for the purpose of servicing and the like.

As a result of the arrangement described, the operator on the platform can completely control the movements of the machine for positioning the various parts in the positions required, and for hoisting the blocks for positioning them in the wall.

Other features such as the control of the main conveyer, the platform conveyer, and the elevator, so that blocks are fed only in proper correlation with the removal, are controlled automatically. If desired, suitable automatic controls can be provided for causing the platform to follow the wall unidirectionally so that the operator need only to shift the elevation to that desired to maintain convenient operating position.

If it is desired to use lower voltages for the operation of the solenoid valves, a low voltage source as well as a higher voltage source can be supplied to the platform through the cable.

It is apparent from the foregoing description that inasmuch as the water and electrical connections are brought to the platform in such a manner that the various circuits can be established, selectively, and controlled, from the platform, the control of the operations is rendered relatively simple.

Thus to summarize the operation, the trailer 20 is hauled to the site desired and, by virtue of the jacks 22, the turntable 7 is leveled. The boom 5 is extended or retracted so as to dispose the carriage 1 at the starting position transversely or lengthwise of the basement where desired. Thereupon, the boom is rocked to dispose the platform at the elevation desired. At the same time, the platform is maintained in a level condition by operation of the piston and cylinder assemblage 55. The operator manipulates the platform, swinging it about an upright axis to transport himself to a convenient working position to begin operation. The hopper 70 is filled with the material required for the mortar mix and a semi-trailer of blocks is moved up alongside the left-hand end of the boom 5. Thereupon, the conveyer 9 is started and operation is continued until sufficient dry mix has reached the mixer 13 on the platform and there been mixed so as to develop a supply at the nozzle. Thereupon, the helper starts laying blocks on the conveyer 9 and these are carried thereby to the elevator 10 and there lowered to the belt or conveyer 122 and brought to the proper position for manipulation by the operator by means of the hoist 12. As the blocks arrive at this position, the operator grips them with the clamping device 160 of the hoist, operates the motor 153 to hoist the blocks to the extent desired, and then swings the blocks into position, meanwhile, with the other hand, operating the nozzle 203 for extruding a ribbon of mortar where required. In the application of the mortar at the position desired, the motor 153 is operated by manipulation of the switch 154 to deposit the block, the alignment of the block being effected by the operator while it is being supported from the hoist 12. The articulation of the arms and post of the hoist 12 are such that the block can be moved to any position desired in all horizontal planes at the levels to which raised by the hoist. It then can be lowered at the rate desired. As soon as each block is lowered, another block is hoisted and the mortar applied and the new block laid in place. Concurrently, the platform is moved along the wall as necessary. If desired, an automatic control of the platform for movement along the wall may be provided so that the speed of the operator can be preselected and the operator thereby can work at the speed at which the platform is moved, the same being adjusted to his maximum efficiency, not necessarily his greatest capacity. The operation can be maintained substantially continuously, the platform 3 and the portion occupied by the mason proceeding along the wall unidirectionally about the periphery of the wall in successive circuits until the wall is completed. If it is desired to proceed above ground, the boom 5 can be tilted upwardly to dispose the carriage at the elevation required. However, if the height exceeds that to which the boom can readily be moved and still position the platform low enough at the side of the enclosure farthest from the trailer 20 over the top of the wall adjacent thereto, then the trailer 20 can be moved, a ramp of dirt quickly laid up, and the entire machine moved to the top of the ramp, whereupon the wall building operations can be repeated.

The mortar extrusion and applying device heretofore provided is suitable for various plastic types of mortar which can withstand extrusion pressures without separating into their constituent elements. However, with the ordinary sand mortars, a problem is presented in that if excessive pressure is applied to the mortar for extruding it, the pressure causes a separation of the water from the mortar, whereupon the resultant residue is merely a mixture of sand and inoperative cementitious material. For the purposes of applying the ordinary sand mortar, the modified form of mixing and extruding device illustrated in FIGS. 26 through 28 is employed.

As there illustrated, the combined mixer and extruder 240 comprises a body 241 which is adapted to be connected to the bin 88 in the same manner as was the mixer 12 heretofore described in connection with FIG. 19.

The body 241 has an end wall 242 with a cylindrical sleeve portion 243 integral therewith. Carried by the end wall and sleeve portion 243 is a suitable bearing 244 in which is rotatably mounted a shaft 245 which extends axially of the body 241. The shaft is rotatably driven by means of a suitable sprocket 246 which, in turn, is driven by a chain 247 and sprocket 248. The sprocket 248 is driven by a motor 249 controlled by the operator by means of a suitable manual press-button switch, as will later be described. Mounted on, and for rotation with, the shaft 245 is a sleeve 250 having paddles 251 thereon, these paddles being pitched so that while mixing the mortar as they are rotated by the shaft 245, they propel the mortar toward the end of the body 241 opposite from the end wall 242. The body 241 has an inlet passage 252 which is connected with the bin 88 and through which the cement, sand, and water are fed into the body 241. Since pressure on the mortar tends to cause the sand and cement to separate from the water, it is desirable that the mixing chamber of the body 1 be free from any abrupt shoulders between the inlet 252 and the point at which the mixing is to be discontinued and the mortar fed to the point of application. For this purpose, the portion 241a of the body is frusto-conical so that there is a gradual reduction in the cross sectional area of the mixing chamber as it approaches the point at which the mixing of the mortar is to cease and the mortar is to be fed to the point of application. Correspondingly, the paddles 251 are shortened at this portion. At the small base of the frusto-conical portion 241a of the body 241 is a portion 241b which is cylindrical and has the same internal diameter as the smaller end of the frusto-conical portion 241a with which it is in communication. At the outer end of the body 241, it is provided with a connection 253 to which a suitable hose 254 can be detachably connected by the usual hose connecting nut 255. Within the cylindrical portion 241b a sleeve 257 on which is a feed screw 258, is mounted on the shaft 245 for rotation therewith.

As illustrated, the internal wall of the body 241 is lined with a liner 259 of wear resisting material, preferably medium soft resilient rubber, silicone, synthetic resins, or the like. The paddles are coated with a like material.

The shaft 245 is unsupported at its outer end, but is preferably stiff enough so that there is no appreciable deflection or weight carried by the inner wall liner 259 of the body 241. The screw is arranged to propel the mixed mortar to the right toward and into the hose 254. If the worm is to be of slightly larger diameter than the internal diameter of the hose, as illustrated, then it is preferable that the chamber be tapered gradually at the portion 259 between the end of the worm and the hose 254.

Upon operation of the motor 249, the mortar is mixed by the paddles 251, pushed to the screw 258, which, in turn, feeds it to, and forces it into and through, the hose 254. As best illustrated in FIGS. 29 through 32, the hose 254 at its discharge end, connects with a hollow handle 260 of an applicator. In the form illustrated, the handle has an axial bore 261 with which the discharge end of the hose communicates. The discharge end of the hose and the bore 261 are coaxial so that there is no abrupt change in the direction of flow of the mortar from the hose into the handle. Further, the handle bore 261 is straight for its full length and it discharges freely into a trowel or applicator 262. The applicator 262 has a portion 262a which is fixedly secured on the handle, and has a suitable aperture 263 to permit the mortar to pass from the bore 261 to the applicating face of the portion 262a.

The portion 262a preferably is in the form of a V-shaped channel connected with its base toward the handle 260. The portion 262a is so arranged that when the handle is gripped in the normal operating position, it extends vertically. At its lower end, the applicator 262 has another portion 262b which is of the same cross section as the portion 262a and opens downwardly.

Mounted on the handle is a push-button switch 265 by which the motor 249 is controlled. Depressing the push button energizes the motor for mixing and feeding the mortar. Release of the push button cuts off the supply of power to the motor, thus stopping the mixing and feed.

With this structure, the mortar fed by the hose passes through the bore 261 in the handle and discharges into the V-shaped applicator portion 262a, whereupon it drops down to the bottom and therefore can readily be spread by the portion 262b. When the mortar is thus placed in the proper position on a lower block to receive the block to be laid and it is desirable to apply mortar to the upright edge of an adjacent block, then the handle is lifted without changing its horizontal position, whereupon since the portion 262a is filled with mortar at least from the aperture 263 to the bottom, upward movement of the applicator, with the handles held in the same position, causes the portion 262a to apply mortar to the vertical edge of a block. As illustrated, both portions 262a and 262b are open at their ends so that a molded ribbon of mortar of any length desired can be provided on which a block can be laid.

Since there are no abrupt angles in the path of travel of the mortar as it is fed from the mixer to the applicator, it can be fed therealong with such a slight amount of pressure that separation of the water therefrom is prevented and the mortar reaches the point of application at the consistency desired.

In applying the mortar, the operator merely depresses the button of the switch 265 with his thumb, which starts the motor 249 and thus starts the flow of mortar through the passage 263. This flow is continued so long as desired and for as long a ribbon of mortar as desired merely by holding the push-button 265 depressed. When the operator has applied sufficient mortar, he merely removes his finger from the push button, in which case the mixer and feed device are stopped and promptly thereafter the flow of mortar ceases.

Having thus described my invention, I claim:

1. A machine for use in laying blocks in a wall and comprising a main frame, a turntable mounted thereon for rotation about an upright axis, guide means, means connecting the guide means to the turntable for rotation therewith to different angular positions about said upright axis, and for rocking about a horizontal rocking axis to different rocked positions in said angular positions, a main boom supported by said guide means for rocking therewith and for endwise movement relative thereto transversely of the turntable in all of said angular and rocked positions, a platform adapted to support a workman in a working position, a support for the platform, pivot means suspending the support from the outer end of the boom for movement with said boom and for swinging movement relative to the boom about a generally horizontal swinging axis spaced from said horizontal rocking axis, connecting means connecting the platform to the lower portion of the support, a first power means operable to rotate the turntable, a second power means connected to the guide and turntable for rocking the guide, a third power means carried by the turntable and connected to the boom for effecting said endwise movement of the boom, a fourth power means connected to the boom and to the support for swinging the support during rocking of the boom so as to maintain the platform horizontal in all of said rocked positions of the boom, and power driven conveyer means carried by the boom for conveying blocks to the support.

2. The machine according to claim 1 and further including control means carried by the support for controlling all of said power means.

3. A machine according to claim 1 and further including feed means on said conveyer means for conveying dry mortar mix to the support.

4. A machine according to claim 1 and further including a mortar mixing device on the platform, a flexible hose connected to the discharge outlet of the device, a discharge nozzle on the hose, valve means under the control of a workman on the platform for discharging a ribbon of mortar.

5. A machine according to claim 1 and further including a power hoist on the flatform under the control of, and arranged for manipulation by, a workman on the platform for assisting him in the hoisting of said blocks and positioning them in a wall.

6. A machine according to claim 1 wherein said connecting means connects the platform to the support for rotation relative to the support and boom about an upright axis, and power means to rotate the platform about said axis.

7. A machine according to claim 1 wherein said conveyer means includes a power driven endless conveyer on the main boom, and further includes a lowering conveyer on the support arranged to receive successive blocks from the conveyer on the boom and lower them successively to the platform.

8. A machine according to claim 7 and further including a power driven endless conveyer on the platform and arranged to receive the successive blocks from the lowering conveyer and convey them to a position wherein they are readily accessible to a workman on the platform.

9. A machine according to claim 1 wherein said conveyer means includes an upwardly open driven endless conveying trough, and wherein are provided a hopper for flowable material, a discharge spout on the hopper positioned to discharge said material into said trough, and means to meter the amount of said material so discharged.

10. A machine according to claim 1 wherein means suspend said platform from said boom for rotation, relative to the boom and support about an upright axis, and further includes a receptacle on the platform, an annular receiving hopper on the platform having its outlet arranged to discharge into the receptacle, said hopper being open at the top, power driven conveyer means on the boom and arranged to discharge into the open top of the annular receiving hopper, and means in the annular receiving hopper for causing the received material to pass to its said outlet.

References Cited in the file of this patent

UNITED STATES PATENTS

| | | |
|---|---|---|
| 1,033,954 | Schindler | July 30, 1912 |
| 1,818,741 | Palatini | Aug. 11, 1931 |
| 2,240,392 | Dowell | Apr. 29, 1941 |
| 2,599,552 | Harney | June 10, 1952 |
| 2,670,241 | Pyles | Feb. 23, 1954 |
| 2,682,432 | Schmidt | June 29, 1954 |